(12) United States Patent
Johnsson et al.

(10) Patent No.: US 10,511,369 B2
(45) Date of Patent: Dec. 17, 2019

(54) EXTENDING ASSOCIATION BEAMFORMING TRAINING

(71) Applicant: Intel Corporation, Santa Clara, CA (US)

(72) Inventors: Kerstin Johnsson, Palo Alto, CA (US); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 322 days.

(21) Appl. No.: 15/627,501

(22) Filed: Jun. 20, 2017

(65) Prior Publication Data

US 2018/0026695 A1 Jan. 25, 2018

Related U.S. Application Data

(60) Provisional application No. 62/365,439, filed on Jul. 22, 2016.

(51) Int. Cl.
*H04B 7/06* (2006.01)
*H04W 16/28* (2009.01)
*H04W 72/04* (2009.01)

(52) U.S. Cl.
CPC ......... *H04B 7/0617* (2013.01); *H04B 7/0619* (2013.01); *H04B 7/0695* (2013.01); *H04W 16/28* (2013.01); *H04W 72/0446* (2013.01); *H04W 72/046* (2013.01)

(58) Field of Classification Search
CPC .. H04B 7/0617; H04B 7/0619; H04B 7/0695; H04W 16/28; H04W 72/0446
USPC ........................................................ 342/368
See application file for complete search history.

(56) References Cited

U.S. PATENT DOCUMENTS

2018/0123665 A1* 5/2018 Oh ........................... H04B 7/06

* cited by examiner

*Primary Examiner* — Harry K Liu
(74) *Attorney, Agent, or Firm* — Schwegman Lundberg & Woessner, P.A.

(57) ABSTRACT

Apparatuses, computer readable media, and methods for extending association beamforming training are disclosed. An apparatus is disclosed including processing circuitry. The processing circuitry being configured to decode an enhanced directional multi-gigabit (EDMG) beacon comprising a multiplier field and a length field of an association beamforming training (A-BFT) interval. The processing circuitry may be further configured to determine a count of sector sweep (SSW) slots based on a value of the multiplier field and a value of the length field of the A-BFT interval, and select a SSW slot of the count of SSW slots. The processing circuitry may be further configured to encode a SSW frame, and configure the station to transmit the SSW frame during the selected slot of the count of SSW slots.

18 Claims, 16 Drawing Sheets

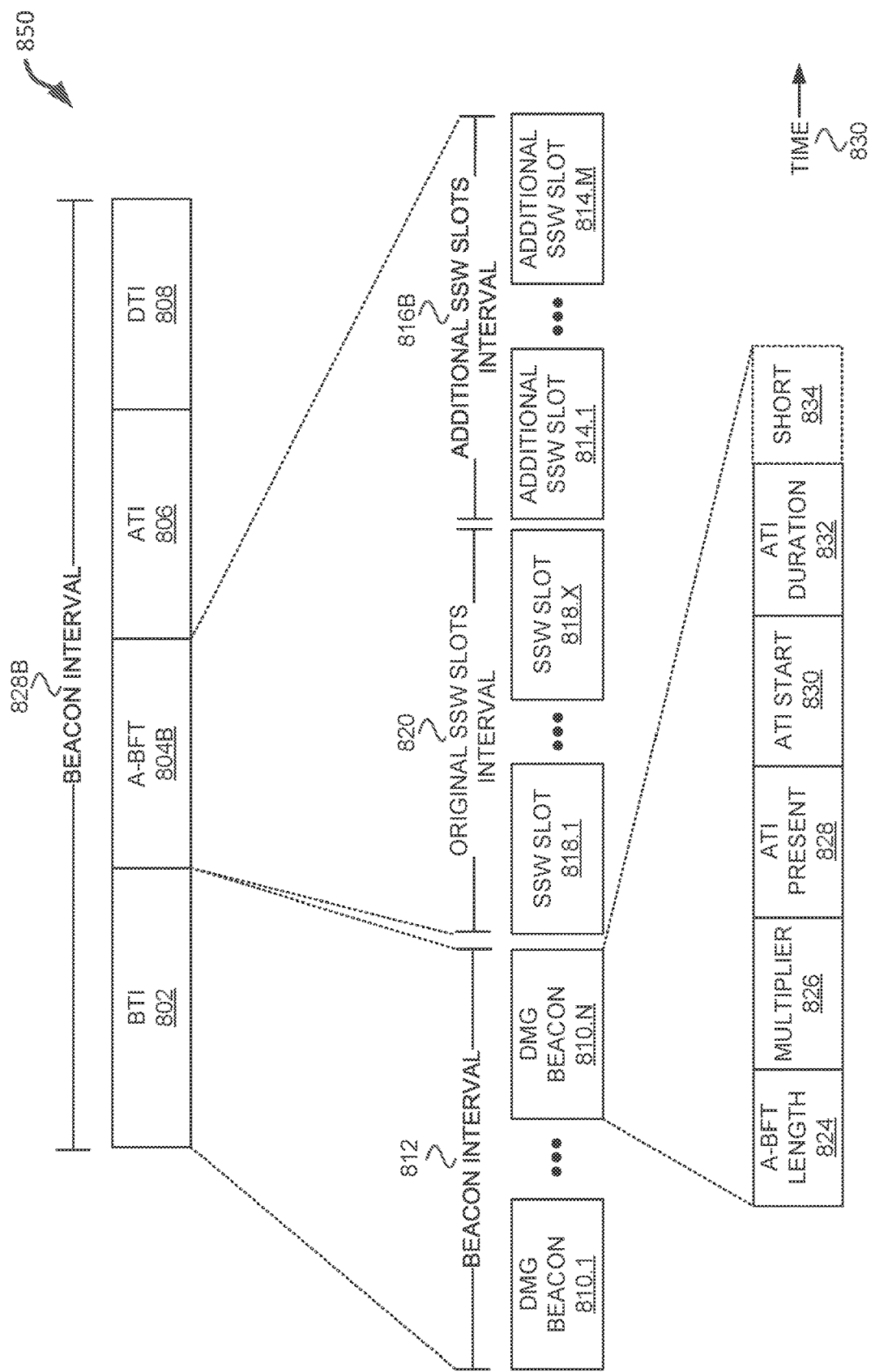

US 10,511,369 B2

EXTENDING ASSOCIATION BEAMFORMING TRAINING

PRIORITY CLAIM

This application claims the benefit of priority under 35 USC 119(e) to U.S. Provisional Patent Application Ser. No. 62/365,439, filed Jul. 22, 2016, the contents of which is incorporated herein by reference in its entirety.

TECHNICAL FIELD

Embodiments pertain to wireless networks and wireless communications. Some embodiments relate to wireless local area networks (WLANs) and Wi-fi networks including networks operating in accordance with the IEEE 802.11 family of standards. Some embodiments relate to IEEE 802.11ay. Some embodiments relate to methods, computer readable media, and apparatuses for extending association beamforming training.

BACKGROUND

Efficient use of the resources of a WLAN is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which:

FIGS. 8A and 8B illustrate beacon intervals having additional SSW slots added after the original SSW slots, in accordance with some embodiments;

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
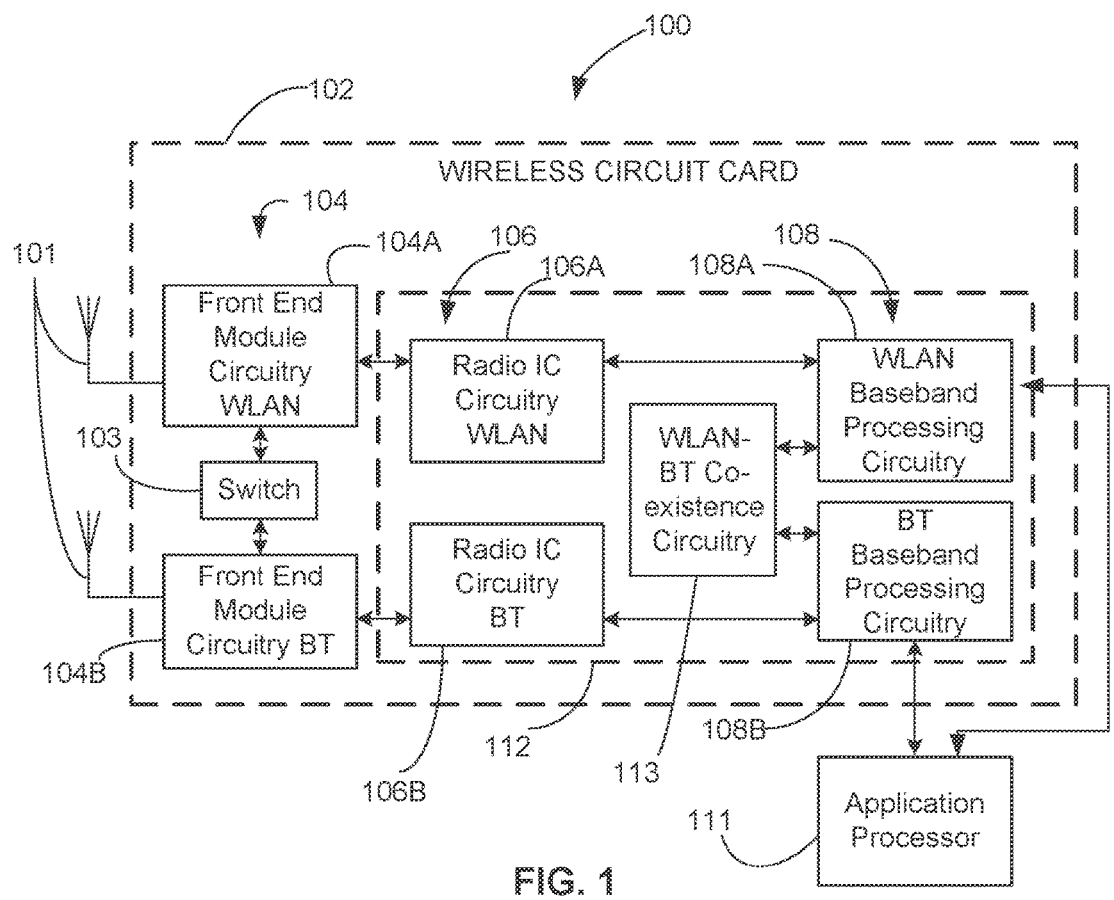
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both WLAN functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104a and a Bluetooth (BT) FEM circuitry 104b. The WLAN FEM circuitry 104a may include a receive signal path comprising circuitry configured to operate on WLAN RF signals received from one or more antennas 101, to amplify the received signals and to provide the amplified versions of the received signals to the WLAN radio IC circuitry 106a for further processing. The BT FEM circuitry 104b may include a receive signal path which may include circuitry configured to operate on BT RF signals received from one or more antennas 102, to amplify the received signals and to provide the amplified versions of the received signals to the BT radio IC circuitry 106b for further processing. FEM circuitry 104a may also include a transmit signal path which may include circuitry configured to amplify WLAN signals provided by the radio IC circuitry 106a for wireless transmission by one or more of the antennas 101. In addition, FEM circuitry 104b may also include a transmit signal path which may include circuitry configured to amplify BT signals provided by the radio IC circuitry 106b for wireless transmission by the one or more antennas. In the embodiment of FIG. 1, although FEM 104a and FEM 104b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106a and BT radio IC circuitry 106b. The WLAN radio IC circuitry 106a may include a receive signal path which may include circuitry to down-convert WLAN RF signals received from the FEM circuitry 104a and provide baseband signals to WLAN baseband processing circuitry 108a. BT radio IC circuitry 106b may in turn include a receive signal path which may include circuitry to down-convert BT RF signals received from the FEM circuitry 104b and provide baseband signals to BT baseband processing circuitry 108b. WLAN radio IC circuitry 106a may also include a transmit signal path which may include circuitry to up-convert WLAN baseband signals provided by the WLAN baseband processing circuitry 108a and provide WLAN RF output signals to the FEM circuitry 104a for subsequent wireless transmission by the one or more antennas 101. BT radio IC circuitry 106b may also include a transmit signal path which may include circuitry to up-convert BT baseband signals provided by the BT baseband processing circuitry 108b and provide BT RF output signals to the FEM circuitry 104b for subsequent wireless transmission by the one or more antennas 101. In the embodiment of FIG. 1, although radio IC circuitries 106a and 106b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108a and a BT baseband processing circuitry 108b. The WLAN baseband processing circuitry 108a may include a memory, such as, for example, a set of RAM arrays in a Fast Fourier Transform or Inverse Fast Fourier Transform block (not shown)) of the WLAN baseband processing circuitry 108a. Each of the WLAN baseband circuitry 108a and the BT baseband circuitry 108b may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108a and 108b may further include physical layer (PHY) and medium access control layer (MAC) circuitry, and may further interface with application processor 110 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108a and the BT baseband circuitry 108b to enable use cases requiring WLAN and BT coexistence. In addition, a switch 103 may be provided between the WLAN FEM circuitry 104a and the BT FEM circuitry 104b to allow switching between the WLAN and BT radios according to application needs. In addition, although the antennas 101 are depicted as being respectively connected to the WLAN FEM circuitry 104a and the BT FEM circuitry 104b, embodiments include within their scope the sharing of one or more antennas as between the WLAN and BT FEMs, or the provision of more than one antenna connected to each of FEM 104a or 104b.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or IC, such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, FEE 802.11-2012, 802.11n-2009, 802.11ac, 802.11ad, 802.11ay, WiGig, and/or 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108b may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
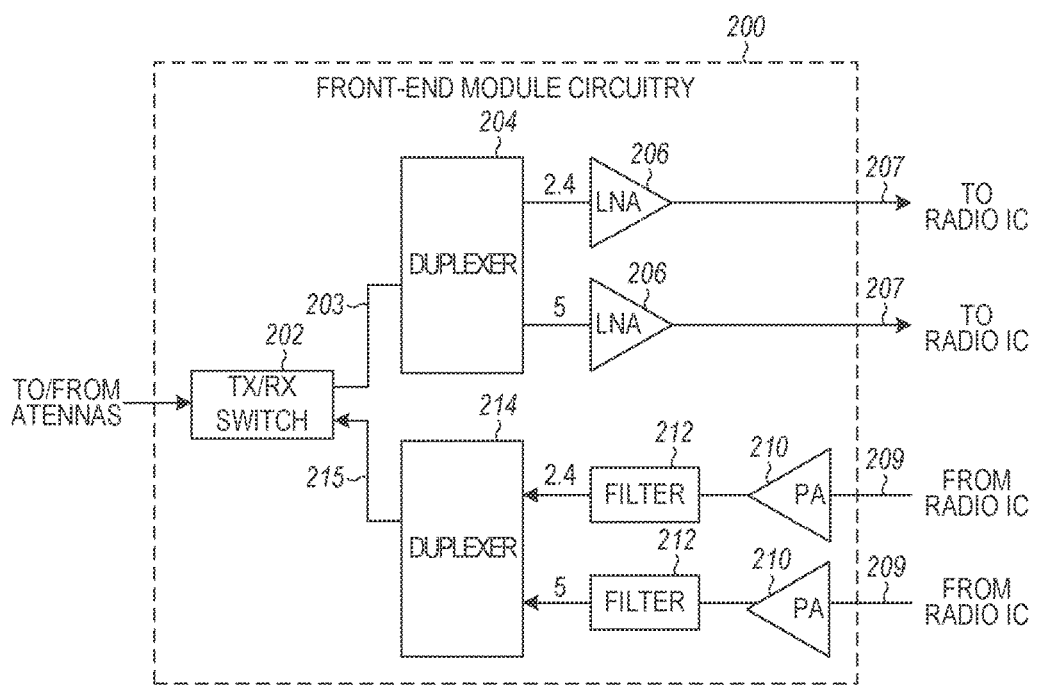
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104a/104b (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in 2.4 GHz frequency spectrum, 5 GHz frequency spectrum, or the 60 GHz frequency. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
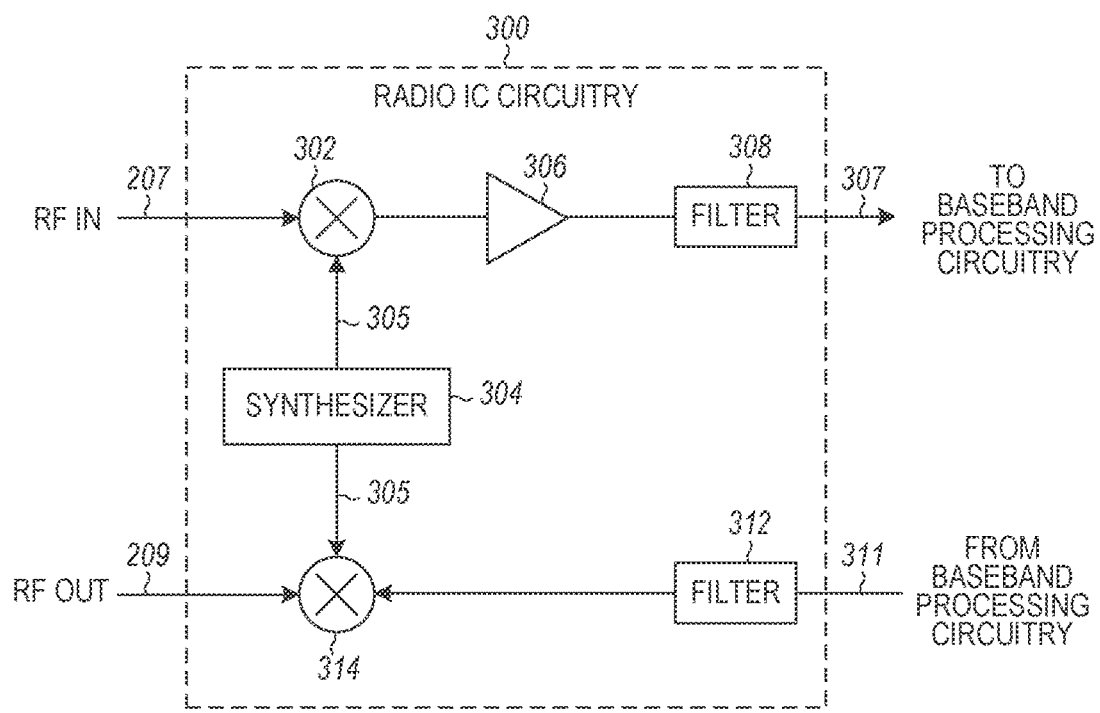
FIG. 3 illustrates a radio integrated-circuit (IC) circuitry for use in the radio architecture of FIG. 1 in accordance with some embodiments.

FIG. 3 illustrates radio integrated-circuitry (IC) circuitry 300 in accordance with some embodiments. The radio IC circuitry 300 is one example of circuitry that may be suitable for use as the WLAN or BT radio IC circuitry 106a/106b (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature, phase (Q) paths). In such an embodiment, RF input signal 207 from FIG. 3 may be down-converted to provide I and Q baseband output signals to be sent to the baseband processor Quadrature passive mixers may be driven by zero and ninety degree time-varying LO switching signals provided by a quadrature circuitry which may be configured to receive a LO frequency (fLO) from a local oscillator or a synthesizer, such as LO frequency 305 of synthesizer 304 (FIG. 3).

In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 110 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 110.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fLO).

Figure 4:
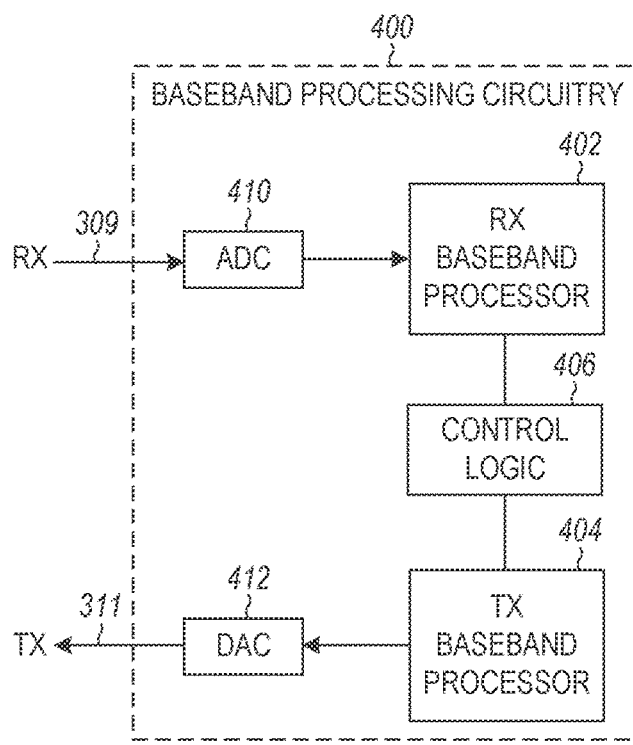
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108a, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for IEEE 802.11 or Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, micro strip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
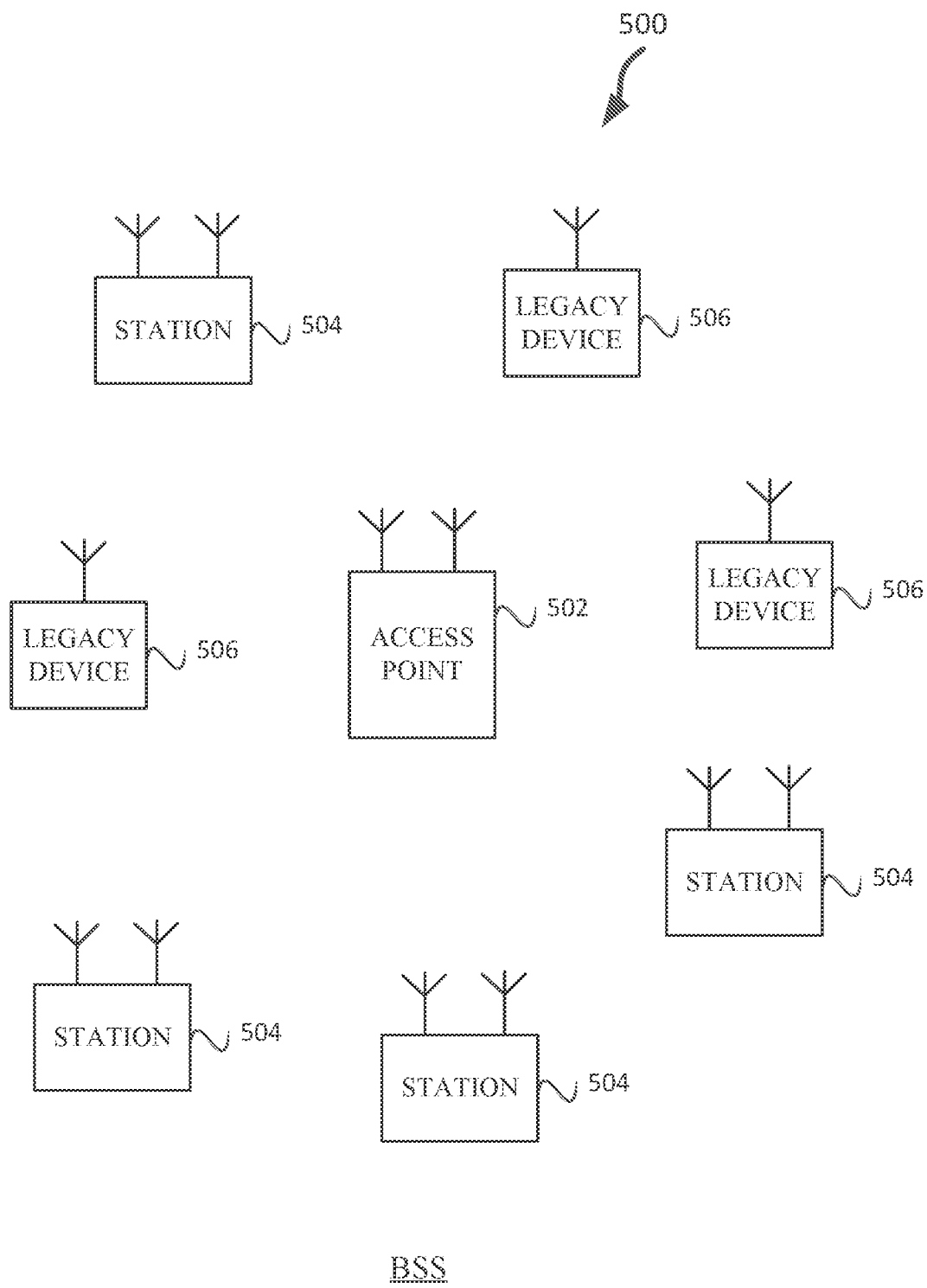
FIG. 5 illustrates a WLAN in accordance with some embodiments.

FIG. 5 illustrates a WLAN 500 in accordance with some embodiments. The WLAN may comprise a basis service set (BSS) 500 or personal BSS (PBSS) that may include a access point (AP) 502, which may be an AP or a station acting as a PBSS control point (PCP), stations 504 (e.g. IEEE 802.11ay), and legacy devices 506 (e.g., IEEE 802.11n/ac/ad). In some embodiments, the access point 502 and/or stations 504 may be an enhanced DMG (EDMG) access point or EDMG stations, respectively. In some embodiments the legacy devices 506 may be DMG devices.

The AP 502 may be an AP configured to transmit and receive in accordance with one or more IEEE 802.11 communication protocols, IEEE 802.11ax or IEEE 802.11ay. In some embodiments, the access point 502 is a base station. The access point 502 may be part of a PBSS. The access point 502 may use other communications protocols as well as the IEEE 802.11 protocol. The IEEE 802.111 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include code division multiple access (CDMA), space-division multiple access (SDMA), multiple-input multiple-output (MIMO), multi-user (MU) MIMO (MU-MIMO), and/or single-input single-output (SISO). The access point 502 and/or station 504 may be configured to operate in accordance with Next Generation 60 (NG60), WiFi Gigabyte (WiGiG), and/or IEEE 802.11ay.

The legacy devices 506 may operate in accordance with one or more of IEEE 802.11 a/b/g/n/ac/ad/af/ah/aj, or another legacy wireless communication standard. The legacy devices 506 may be IEEE 802 stations. The stations 504 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ay/ax or another wireless protocol. The stations 504 and/or access point 502 may be attached to a BSS and may also operate in accordance with IEEE 802.11ay where one of the stations 504 and/or access point 502 takes the role of the PCP. The access point 502 may be a station 504 taking the role of the PCP.

The access point 502 may communicate with legacy devices 506 in accordance with legacy IEEE 802.11 communication techniques. In example embodiments, the access point 502 may also be configured to communicate with stations 504 in accordance with legacy IEEE 802.11 communication techniques. The access point 502 may use techniques of 802.11ad for communication with legacy devices 106. The access point 502 and/or stations 504 may be a PBSS Control Point (PCP) which can be equipped with large aperture antenna array or Modular Antenna Array (MAA).

The access point 502 and/or stations 504 may be equipped with more than one antenna. Each of the antennas of access point 502 and/or stations 504 may be a phased array antenna with many elements. In some embodiments, an IEEE 802.11ay frame may be configurable to have the same bandwidth as a channel. In some embodiments, the access point 502 and/or stations 504 may be equipped with one or more DMG or EDMG antennas, which may include multiple radio-frequency base band (RF-BB) chains. The access point 502 and/or stations 504 may be configured to perform beamforming and may have an antenna weight vector associated with one or more antennas. In some embodiments, the AP 502 and/or stations 504 may be an EDMG AP 502 or EDMG station 504, respectively. In some embodiments, the access point 502 and/or STA 504 may transmit a frame, e.g., physical layer convergence protocol (PLCP) protocol data unit (PPDU)).

An IEEE 802.11ay frame may be configured for transmitting a number of spatial streams, which may be in accordance with MU-MIMO. In other embodiments, the AP 502, stations 504, and/or legacy devices 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies. In some embodiments, the AP 502 and/or stations 504 may be configured to implement more than one communications protocols, which may be collocated in the same device. The two or more communications protocols may use common or separate components to implement the communications protocols.

In accordance with some IEEE 802.11ay embodiments, an AP 502 may be arranged to contend for a wireless medium (e.g., during a contention period) to receive exclusive control of the medium, which may be termed a transmission opportunity (TXOP) for performing beamforming training for a multiple access technique such as OFDMA or MU-MIMO. In some embodiments, the multiple-access technique used during a TXOP may be a scheduled OFDMA technique, although this is not a requirement. In some embodiments, the multiple access technique may be a space-division multiple access (SDMA) technique. The AP 502 may communicate with legacy stations 506 and/or stations 504 in accordance with legacy IEEE 802.11 communication techniques.

In example embodiments, the radio architecture of FIG. 5, the front-end module circuitry of FIG. 2, the radio IC circuitry of FIG. 3, and/or the base-band processing circuitry of FIG. 4 may be configured to perform the methods and functions described herein in conjunction with FIGS. 1-16.

In example embodiments, the stations 504, an apparatus of the stations 504, the access point 502, and/or an apparatus of an access point 502, may include one or more of the following: the radio architecture of FIG. 1, the front-end module circuitry of FIG. 2, the radio IC circuitry of FIG. 3, and/or the base-band processing circuitry of FIG. 4.

In example embodiments, the stations 504, apparatuses of the stations 504, the access points 502, and/or apparatuses of the access point 502, are configured to perform the methods and functions described herein in conjunction with FIGS. 1-16. The term Wi-Fi may refer to one or more of the IEEE 802.11 communication standards. AP may refer to an access point 502. STA may refer to a station 504 and/or a legacy device 506.

Figure 6A:
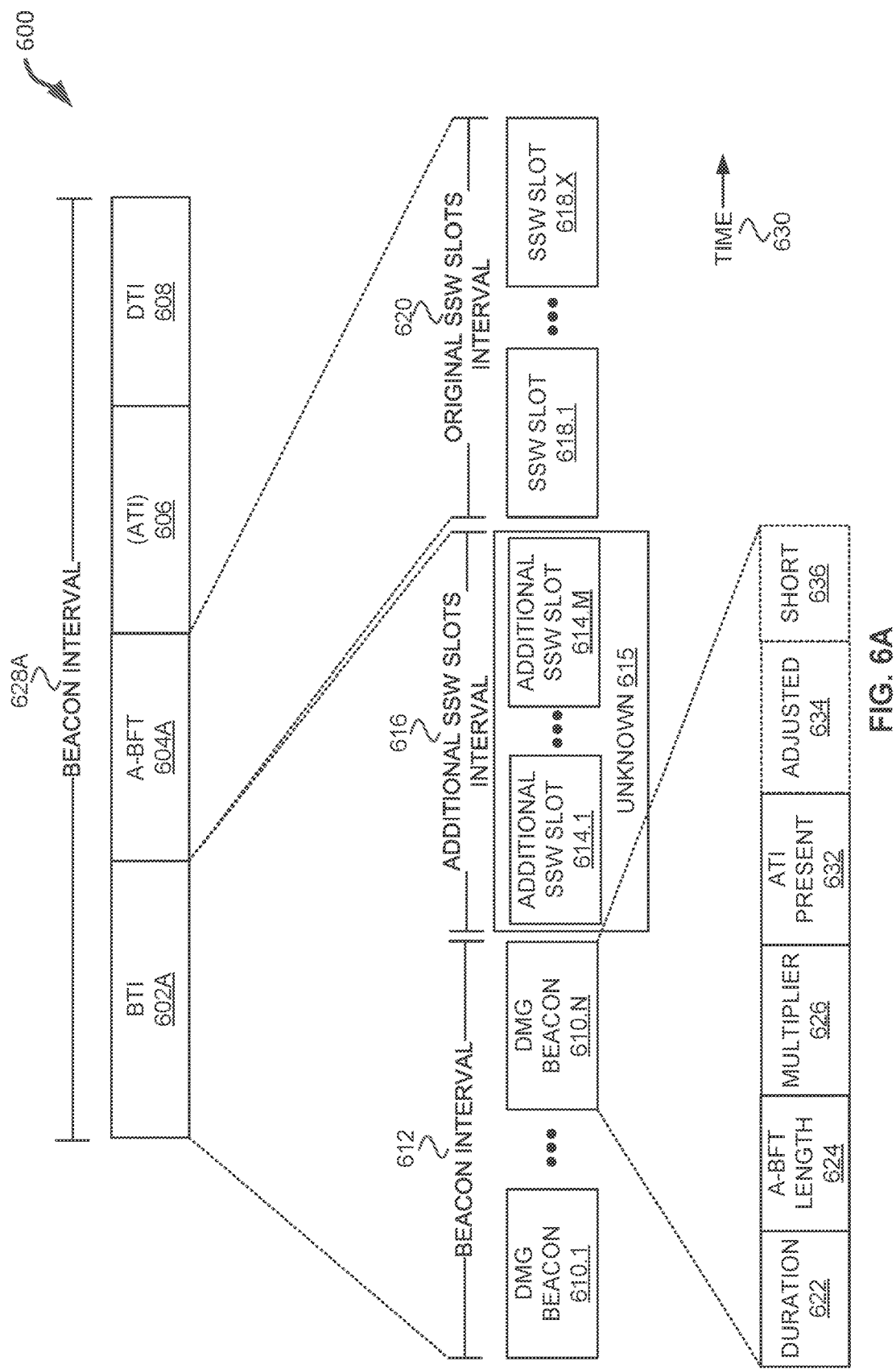
FIGS. 6A and 6B illustrate beacon intervals having additional sector sweep (SSW) slots added before the original SSW slots, in accordance with some embodiments.
Figure 6B:
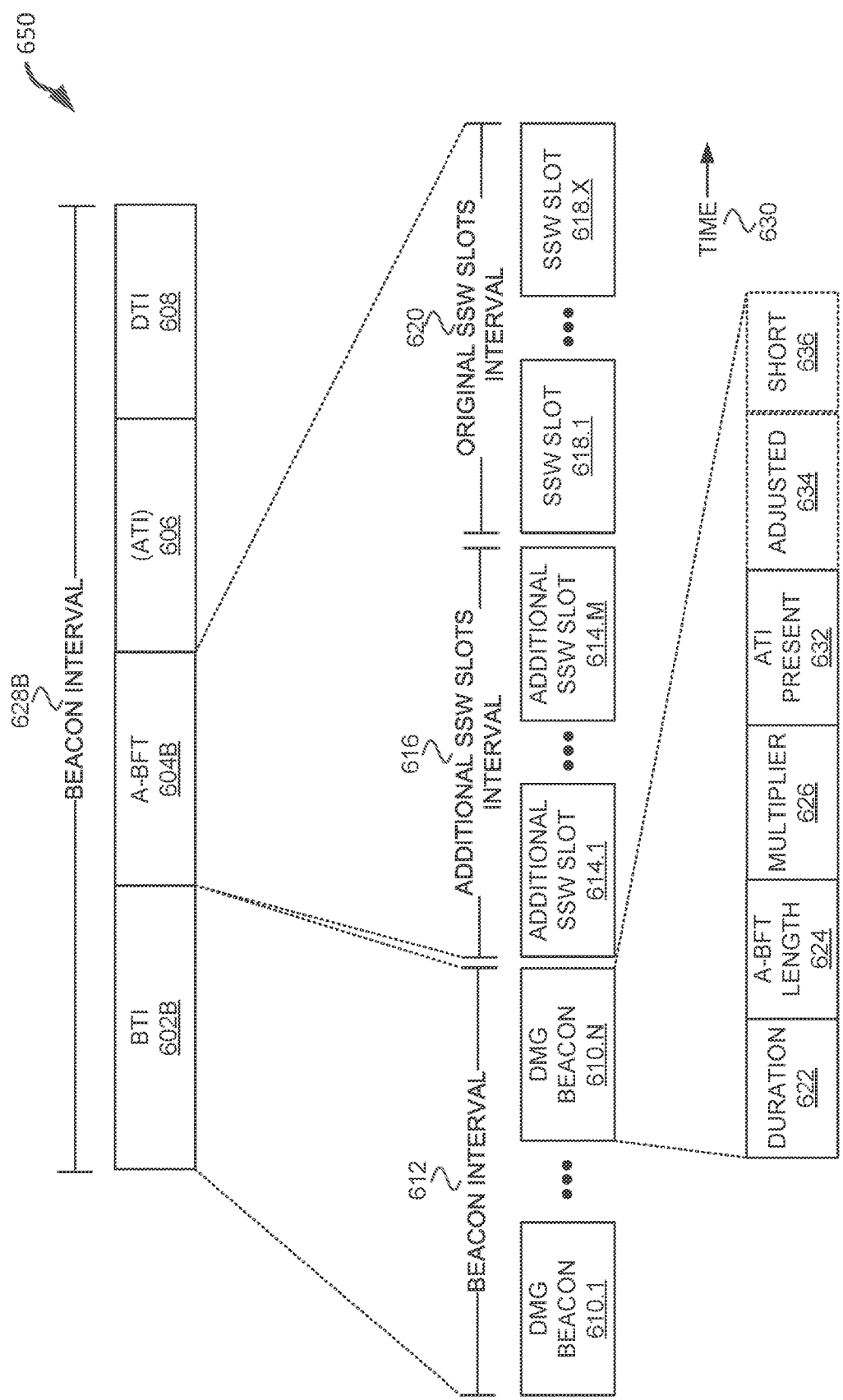

FIGS. 6A and 6B illustrate beacon intervals 628A and 628B, respectively, having an additional sector sweep (SSW) slots interval 616 added before the original SSW slots 618, in accordance with some embodiments.

Illustrated in FIG. 6A is beacon interval 628A and time 630. Beacon interval 628A may include beacon transmission interval (BTI) 602A, association beamforming training (A-BFT) 604A, ATI 606 (which is optional), and data transfer interval (DTI) 608. In some embodiments, an A-BFT may be referred to as an A-BFT interval, A-BFT period, and/or A-BFT access period. Illustrated in FIG. 6B is beacon interval 628B and time 630. Beacon interval 628B may include BTI 602B, A-BFT 604B, ATI 606 (which is optional), and DTI 608. FIG. 6A represents how a DMG station (e.g., legacy device 506) or DMG AP (e.g., legacy device 506) would decode the beacon interval 628A based on DMG beacons 610. FIG. 6B represents how an EDMG station (e.g., station 504) or EDMG AP (e.g., AP 502) would decode the beacon interval 628B based on DMG beacons 610.

In some embodiments, the BTI 602A, 602B is a portion of the beacon interval 628A, 628B where DMG beacons 610 may be transmitted by an AP 502 or a station 504 acting as a PCP. The DMG beacons 610 may be EDMG beacons, DMG beacons 610 (e.g., DMG beacon 610.*n*) may include a duration field 622, A-BFT length field 624, multiplier field 626, ATI present field 632, adjusted field 634 (which may be optional), and short field 636 (which may be optional). The duration field 622 may be a duration of the DMG beacon 610.*n*. In some embodiments, the duration field 622 may indicate a time remaining until the end of the BTI 602A, BTI 602B. DMG beacon 610.*n* may be the last DMG beacon 610 of the BTI 602A, BTI 602B. In some embodiments, the value of the duration field 622 extends to the end of the additional SSW slot 614.*m* so that legacy devices 506 (e.g., DMG stations or DMG APs) will defer during the additional SSW slots interval 616. A DMG station may read the duration field 622 field of the last DMG beacon 610.*n*, and may interpret the additional SSW slots interval 616 as part of the last DMG beacon 610.*n* and/or as part of the BTI 602A. In some embodiments, during the additional SSW slots interval 616 (e.g., to the end of additional SSW slot 614.*m*), the DMG station will not know that there are additional SSW slots 614. In some embodiments, to the DMG station it will be unknown 615 what occurs during the additional SSW slots interval 616. In some embodiments, the DMG station will ignore what occurs during the additional SSW slots interval 616.

In some embodiments, a value of a duration field 622 of one or more of the DMG beacons 610.1 through 610.*n* indicates a time that extends to the end of the additional SSW slots interval 616, e.g., to the end of the additional SSW slot 614.*m*.

The value of the A-BFT length field 624 may indicate the size or number (e.g., x) of the SSW slots 618.1 through SSW slots 618.*x*. The value of the A-BFT length field 624 may be in units of SSW slots 618. In some embodiments, the value of this field may be in the range of 1 to 8. In some embodiments, the value may be equal to a number represented by the A-BFT length field 624 plus 1.

The multiplier field 626 may indicate an adjustment to the A-BFT length field 624 field. For example, in some embodiments the multiplier field 626 may indicate an integer multiple of the number of SSW slots 618 indicated by the A-BFT length field 624. The multiplier field 626 may indicate the number of additional SSW slots 614 in a different way. The value of the ATI present field 632 may indicate whether the beacon interval 628A, 628B includes the ATI 606. The value of adjusted field 634 may indicate whether the value of the duration field 622 was adjusted for backward compatibility with DMG stations and DMG APs. In some embodiments, if the value of adjusted field 634 is zero, then the value of duration field 622 is not adjusted, and if the value of adjusted field 634 is 1, then the value of duration field 622 is adjusted. The short field 636 may indicate whether the additional SSW slots 614 are in a different format than the SSW slots 618, e.g., a short format.

A legacy device 506 (e.g., DMG station) may interpret the information in the DMG beacon 610 (e.g., DMG beacon 610.N) or DMG beacons 610.1 through DMG beacons 610.N to mean that the BTI 602A extends to the end of the additional SSW slot 614.M (e.g., the duration field 622 may indicate a duration that extends to the end of the additional SSW slot 614.M). The legacy device 506 may not be able to interpret the additional SSW slots 614.1 through additional SSW slots 614.M (e.g., unknown 615), but will defer for the value of the duration field 622.

A station 504 (e.g., EDMG station) or AP 502 (EDMG AP) may interpret the information in the DMG beacon 610 (e.g., DMG beacon 610.N) or DMG beacons 610.1 through DMG beacons 610.N as the BTI 602B extends only to the end of the DMG beacon 610.N. For example, a station 504 or AP 502 may reduce the duration 622 by an amount of the additional SSW slots interval 616. For example, a station 504 or AP 502 may determine the duration of DMG beacon 610.N as equal to the value of duration 622 minus the duration of ((1+value of multiplier field 626) times (value of A-BFT length field 624)). The station 504 or AP 502 may need to adjust for whether the additional SSW slots 614 have a different duration than the SSW slots 618 e.g., based on the short 636 field. A station 504 (e.g., EDMG station) or AP 502 (EDMG AP) may determine a length of the A-BFT 604B as equal to (1+value of multiplier field 626) times (value of A-BFT length field 624).

A station 504 (e.g. EDMG station) or AP 502 (EDMG AP) may adjust the value of the duration field 622 to remove the duration added to extend the duration to the end of the additional SSW slots interval 616 so that A-BFT 604B begins with additional SSW slot 614.1. In some embodiments, if the value of the adjusted field 634 indicates that the value of the duration field 622 is adjusted to extend the BTI 602B to include the additional SSW slots 614, then the station 504 or AP 502 adjusts the value of the duration field 622 to remove the duration that includes the additional SSW slots 614, and the station 504 or AP 502 does not adjust the duration field 622 if the value of adjusted field 634 indicates that value of duration field 622 was not adjusted to extend BTI 602B to include the additional SSW slots 614, e.g., the value of duration field 622 was not adjusted for backward compatibility for DMG stations and DMG APs.

A SSW slot (e.g., additional SSW slot 614 or SSW slot 618) may provide an opportunity for a station 504 or legacy device 506 to transmit SSW frames as a responder to an initiator (e.g., AP 502 or station 504 acting as a PCP). The initiator may then provide feedback to the station 504 or legacy device 506. The DMG beacon 610.N may indicate a number of frames within the additional SSW slot 614 and SSW slot 618. The station 504 or legacy device 506 may need to access an additional SSW slot 614 or SSW slot 618 to associate with the AP 502 or station 504 acting as a PCP, and/or to receive feedback for beamforming.

Figure 7:
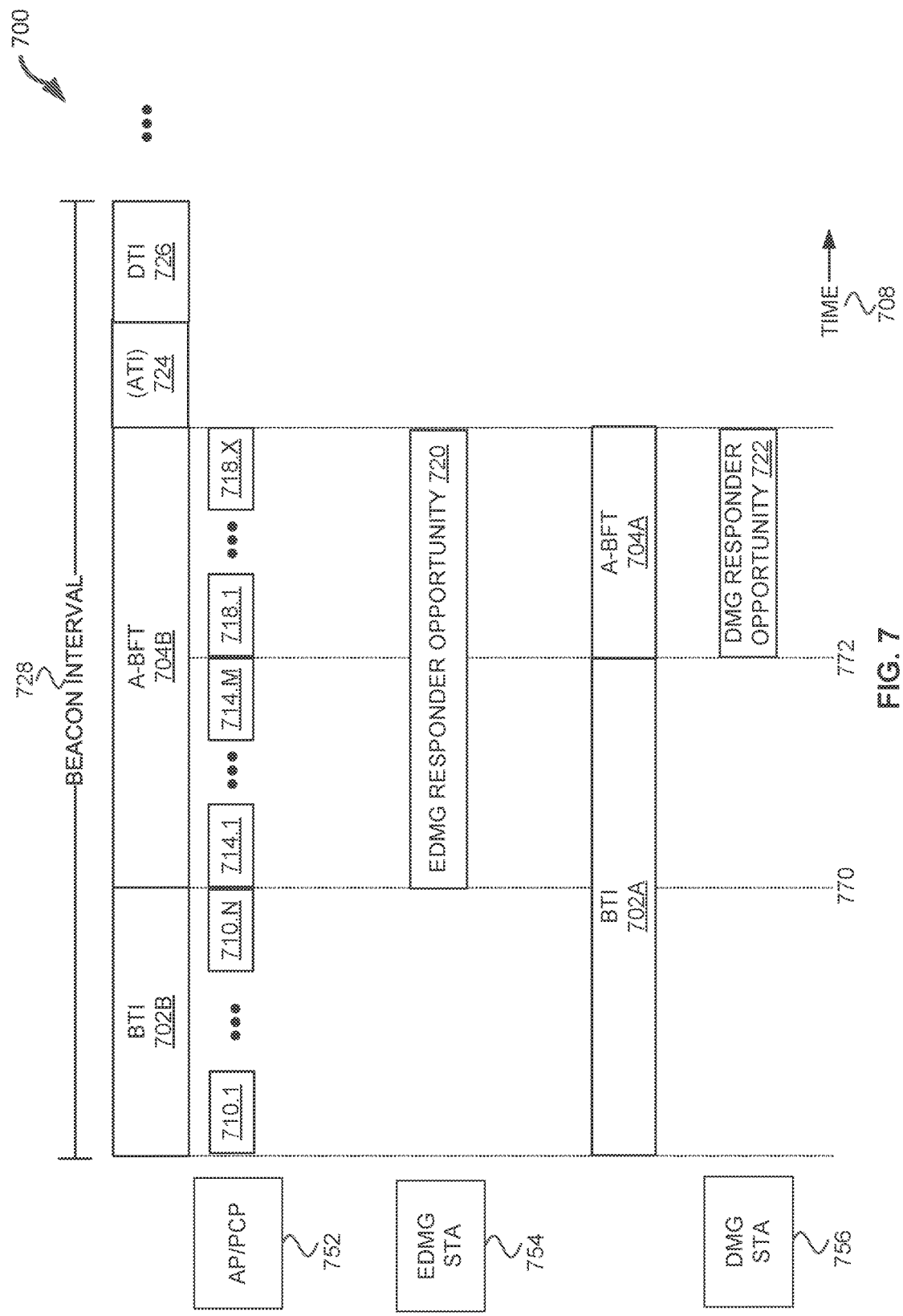
FIG. 7 illustrates a method of extending association beamforming training in accordance with some embodiments.

FIG. 7 illustrates a method 700 of extending association beamforming training in accordance with some embodiments. Illustrated in FIG. 7 is a beacon interval 728, AP/PCP 752, EDMG STA 754, DMG STA 756, and time 708 along a horizontal axis.

The AP/PCP 752 may be an AP 502 or station 504 acting as a PCP. The EDMG STA 754 may be a station 504. The DMG STA 756 may be a legacy station 506.

The beacon interval 728 may be a beacon interval the same or similar as beacon interval 628A or 628B. The method 700 may begin with the AP/PCP 752 encoding and transmitting DMG beacons 710.1 through 710.N. DMG beacons 710 may be the same or similar as DMG beacons 610. The DMG beacons 710 may be EDMG beacons. The AP/PCP 752 may encode one or more of the DMG beacons 710.1 through 710.N (e.g., 710.N) to include an adjusted field (e.g. 634). In some embodiments, if the value of the adjusted field (e.g., 634) indicates backward compatibility for DMG stations and DMG APs, then the value of the duration field (e.g., 622) is extended to include the additional SSW slots 714. If the value of the adjusted field (e.g. 634) indicates no backward compatibility for DMG stations and DMG APs, then the value of the duration field (e.g., 622) is not extended to include the additional SSW slots 714. In some embodiments, the adjusted field (e.g., 634) is not included in the DMG beacons 710, and the value of duration (e.g., 622) is extended to include the additional SSW slots 714. In some embodiments, the adjusted field (e.g., 634) is indicated in a different way, e.g., in an information element in a beacon frame, probe response, or association frame.

The method 700 continues with EDMG STA 754 decoding one or more of DMG beacons 710.1 through 710.N and determining a duration field, A-BFT length field, multiplier field, ATI present field, adjusted field (optional), and short field (optional), as described in conjunction with FIGS. 6A and 6B. EDMG STA 754 may determine that EDMG STA 754 has EDMG responder opportunity 720, which includes additional SSW slots 714.1 through additional SSW slots 714.M, and SSW slot 718.1 through SSW slot 718.X. EDMG STA 754 may determine that the BTI 702B ends at time 770 based on the duration field, the A-BFT length field, the multiplier field, and/or adjusted field. The EDMG STA 754 may select a SSW slot from the additional SSW slots 714.1 through 714.M, and SSW slots 718.1 through 718.X to transmit a SSW frame on as a responder to the AP/PCP 752. The EDMG STA 754 may randomly select a number between 1 and the number of SSW slots included in the additional SSW slots 714 and the SSW slots 718, and transmit a SSW frame on the selected SSW slot. In some embodiments, the EDMG STA 754 may select a SSW slot from the additional SSW slots 714.1 through additional SSW slots 714.M. The additional SSW slots 714 and SSW slots 718 may have a duration that enables a number of SSW frames to be transmitted by the EDMG STA 754 and for feedback regarding the SSW frames to be transmitted by the AP/PCP 752 to the EDMG STA 754 (e.g., the EDMG STA 754 may transmit eight SSW frames with a short beamforming inter-frame space (SBIFS) duration between the SSW frames, which may be followed by the AP/PCP 752 transmitting feedback to the EDMG STA 754 based on the eight SSW frames.)

In some embodiments, the EDMG STA 754 will determine the length of the A-BFT 704B as (1+value of multiplier field 626)×value of A-BFT length field 624. In some embodiments, the EDMG STA 754 will first attempt to use a slot from the additional SSW slots 714.1 through 714.M, and then if the selection is unsuccessful (e.g., the SSW slot is in use by another EDMG STA 754), the EDMG STA 754 will attempt to use a slot from the SSW slots 718.1 through 718.X. In some embodiments, the EDMG STA 754 will only attempt to use a slot from the additional SSW slots 714.1 through 714.M. In some embodiments, the EDMG STA 754 will base the selection of a slot from the SSW slots based on whether the adjusted field (e.g., 634) indicates that legacy devices 506 are to be accommodated.

The method 700 continues with DMG STA 756 decoding one or more of DMG beacons 710.1 through 710.N and determining a duration field, A-BFT length field, multiplier field, and ATI present field, as described in conjunction with FIGS. 6A and 6B. DMG STA 756 may only be able to interpret the legacy fields of DMG beacons 710. DMG STA 756 may determine that DMG STA 756 has DMG responder opportunity 722, which includes SSW slots 718.1 through SSW slot 718.X. DMG STA 756 may determine that the BTI 702A ends at time 772 based on the duration field and/or A-BFT length field of DMG beacon 710.N. The DMG STA 756 may select a SSW slot from the SSW slots 718.1 through 718.X to transmit a SSW frame on as a responder to the AP/PCP 752. The DMG STA 756 may randomly select a number between 1 and the number of SSW slots included in the SSW slots 718, and transmit a SSW frame on the selected SSW slot 718. The SSW slots 718 may have a duration that enables a number of SSW frames to be transmitted by the DMG STA 756 and feedback regarding the SSW frames to be transmitted by the AP/PCP 752 to the DMG STA 756 (e.g., the DMG STA 756 may transmit eight SSW frames with a SBIFS duration between the SSW frames, which may be followed by the AP/PCP 752 transmitting feedback to the DMG STA 756 based on the eight SSW frames.) The DMG STA 756 may determine the duration of the A-BFT 704B based on the duration field, A-BFT length field, and ATI present field, as described in conjunction with FIGS. 6A and 6B. The DMG STA 756 may defer during the interval for the additional SSW slots as described in conjunction with FIGS. 6A and 6B. The DMG STA 756 may not properly decode the additional SSW frames 714 during the BTI 702A, but will be able to start decoding the SSW frames 718 properly once the A-BFT 704A starts. The DMG STA 756 will not be able to decode the multiplier field (e.g., 626), adjusted field (e.g., optional 634), or short field (e.g., optional 636) in accordance with some embodiments.

Figure 8A:
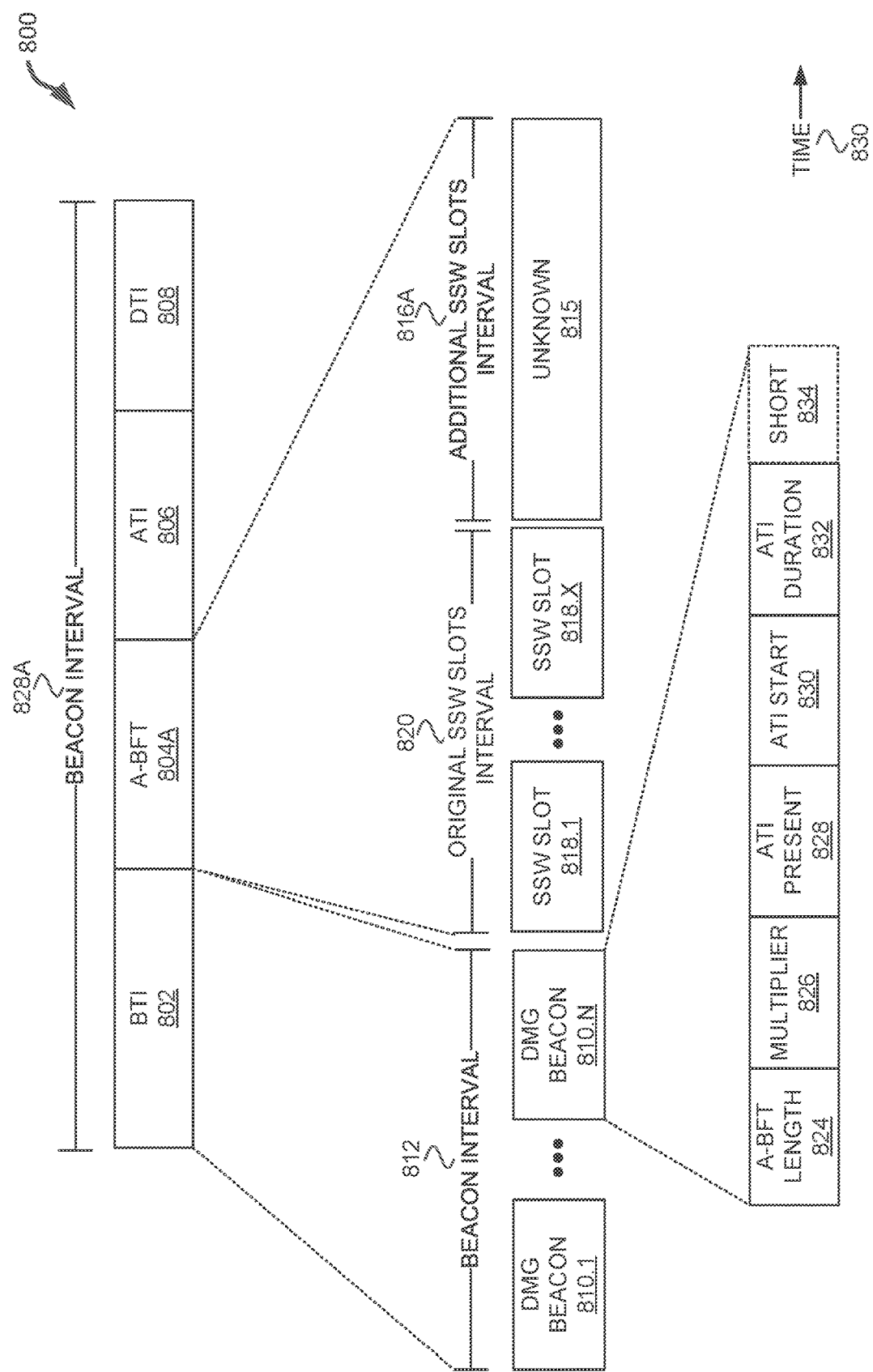

FIGS. 8A and 8B illustrate beacon intervals 828A and 828B, respectively, having additional SSW slots 814 (see FIG. 8B) added after the original SSW slots 818, in accordance with some embodiments.

Illustrated in FIG. 8A is beacon interval 828A and time 830. Beacon interval 828A may include BTI 802, A-BFT 804A, ATI 806, and DTI 808. Illustrated in FIG. 8B is beacon interval 828B and time 830. Beacon interval 828B may include BTI 802, A-BFT 804B, ATI 806, and DTI 808. FIG. 8A represents how a DMG station (e.g., legacy device 506) or DMG AP (e.g., legacy device 506) would decode the beacon interval 828A based on DMG beacons 810. FIG. 8B represents how an EDMG station (e.g., station 504) or EDMG AP (e.g., AP 502) would decode the beacon interval 828B based on DMG beacons 810.

In some embodiments, the BTI 802 (FIGS. 8A and 8B) is a portion of the beacon intervals 828A and 828B where DMG beacons 810 may be transmitted by an AP 502 or a station 504 acting as a PCP. The DMG beacons 810 may be EDMG beacons. DMG beacon 810.N may include (among other fields) an A-BFT length field 824, multiplier field 826, ATI present field 828, ATI start field 830, ATI duration field 832, and short field 834 (optionally).

DMG beacon 810.N may be the last DMG beacon 810 of the BTI 802. The value of the A-BFT length field 824 may indicate the size or number (e.g., X) of the SSW slots 818, e.g., SSW slots 818.1 through SSW slots 818.X. The value of the A-BFT length field 824 may be in units of SSW slots 818. In some embodiments, the value of this field may be in the range of 1 to 8. In some embodiments, the value may be equal to a number represented by the A-BFT length field 824 field plus 1.

The multiplier field 826 may indicate an adjustment to the A-BFT length field 824 field. For example, in some embodiments, the multiplier field 826 may indicate an integer multiple of the number of SSW slots 818 indicated by the A-BFT length field 824. The multiplier field 826 may indicate the number of additional SSW slots 814 in a different way. The value of the ATI present field 828 may indicate whether the beacon interval 828A, 828B includes the ATI 806. The value of ATI start field 830 may indicate when the ATI 806 starts. The value of ATI duration field 832 may indicate a value of the duration of the AT 806.

The legacy device 506 may not be able to interpret the additional SSW slots 814.1 through additional SSW slots 814.M (see FIG. 8B), but will defer during the additional SSW slots interval 816A (e.g., unknown 815). The legacy device 506 may not be able to decode the additional SSW slots 814 (FIG. 8B) so they may be unknown 815 to the legacy device 506.

A station 504 (e.g., EDMG station) or AP 502 (EDMG AP) may determine the A-BFT 804B length as equal to (1+value of multiplier field 826) times (value of A-BFT length field 824). A station 504 (e.g., EDMG station) or AP 502 (EDMG AP) may determine the number of additional SSW slots 814 based on the value of the A-BFT length field 824 and the value of the multiplier field 826 (e.g., (1+value of multiplier 826)×value of A-BFT length field 824). In some embodiments, the multiplier field 826 is not included in the DMG beacon 810, and the station 504 may determine a number of additional SSW slots 814 based on extra duration in the A-BFT 804B that is not used by the SSW slots 818 before the beginning time of the ATI 806.

A legacy device 506 (e.g., DMG STA or DMG AP) may decode the ATI present field 828, ATI start field 830, and ATI duration field 832 to determine when the ATI 806 starts in the beacon interval 828A. The legacy device 506 may not know how to decode the additional SSW slots 814, but may defer until the ATI 806 begins. In some embodiments, short field 834 may indicate a duration of the additional SSW slots 814, which may be different than the SSW slots 818.

Figure 9:
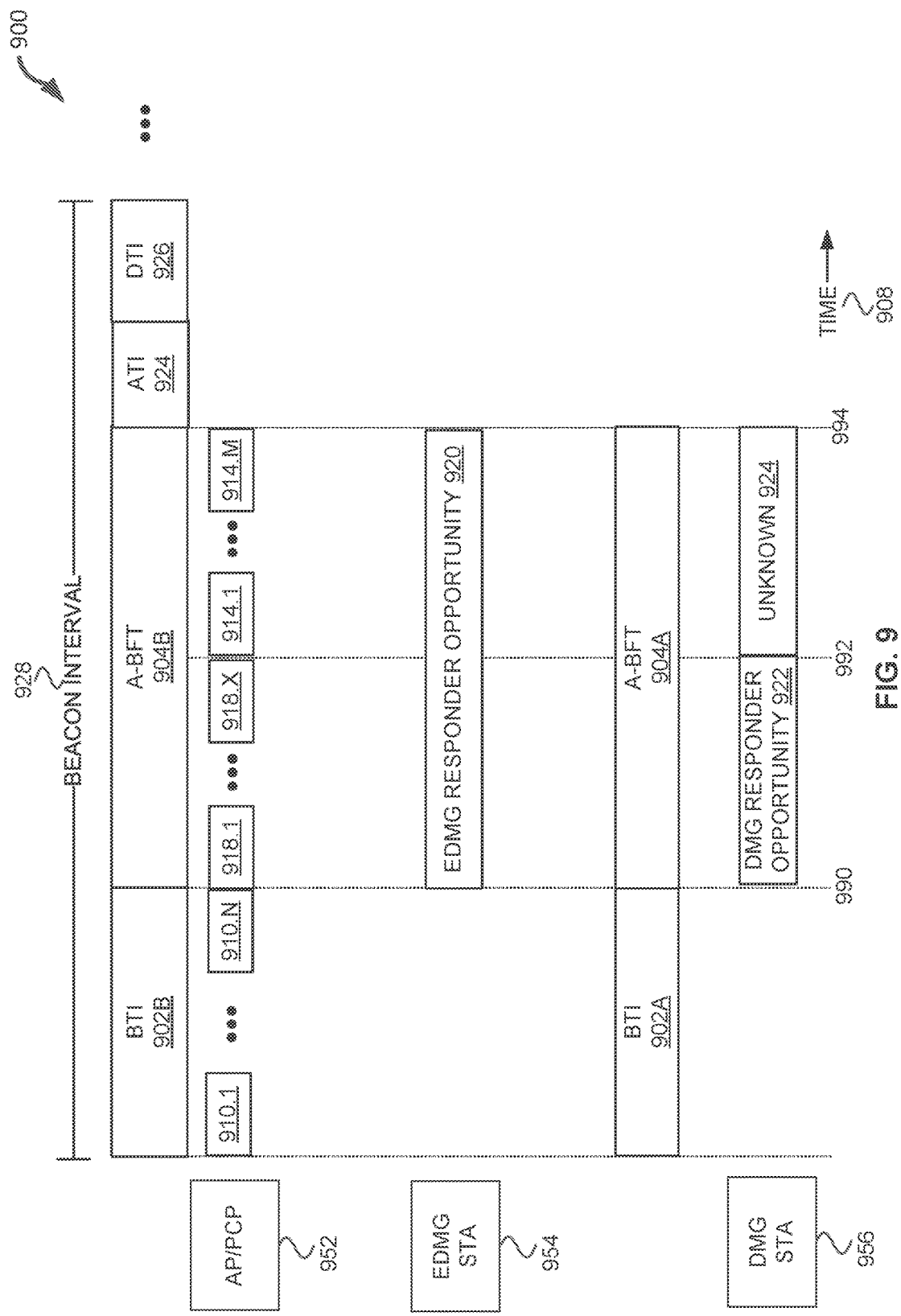
FIG. 9 illustrates a method of extending association beamforming training in accordance with some embodiments.

FIG. 9 illustrates a method 900 of extending association beamforming training in accordance with some embodiments. Illustrated in FIG. 9 is a beacon interval 928, AP/PCP 952, EDMG STA 954, DMG STA 956, and time 908 along a horizontal axis.

The AP/PCP 952 may be an AP 502 or station 504 acting as a PCP. The EDMG STA 954 may be a station 504. The DMG STA 956 may be a legacy station 506.

The beacon interval 928 may be a beacon interval the same or similar as beacon intervals 828A and 828B. The method 900 may begin with the AP/PCP 952 encoding and transmitting DMG beacons 910.1 through 910.N. DMG beacons 910 may be the same or similar as DMG beacons 810. The AP/PCP 952 may encode one or more of the DMG beacons 910.1 through 910.N (e.g., 910.N) to include A-BFT length field 824, multiplier field 826, ATI present field 828, ATI start field 830, ATI duration field 832, and/or short 834 (optionally), e.g., as described in conjunction with FIGS. 8A and 8B.

The method 900 continues with EDMG STA 954 decoding one or more of DMG beacons 910.1 through 910.N and determining a number of SSW slots 918 and additional SSW slots 914. For example, EDMG STA 954 may determine the length of the A-BFT 904B as equal to (1+value of multiplier field 826) times (value of A-BFT length field 824). EDMG STA 954 may determine the number of additional SSW slots 914 based on the value of the A-BFT length field 824 and the value of the multiplier field 826 (e.g., (1+value of multiplier field 826)×value of A-BFT length field 824). In some embodiments, the multiplier field 826 is not included in the DMG beacon 910, and the EDMG STA 954 may determine a number of additional SSW slots 914 based on an extra duration of the A-BFT 904B that is not used by the SSW slots 918 before the start of the ATI 924 (e.g., ATI start field 830).

EDMG STA 954 may determine that EDMG STA 954 has EDMG responder opportunity 920, which includes additional SSW slots 914.1 through additional SSW slots 914.M, and SSW slot 918.1 through SSW slot 918.X.

The EDMG STA 954 may select a SSW slot from the SSW slots 918.1 through 916.X, and additional SSW slots 914.1 through 914.M to transmit a SSW frame on as a responder to the AP/PCP 952. The EDMG STA 954 may randomly select a number between 1 and the number of SSW slots included in the additional SSW slots 914 and the SSW slots 918, and transmit a SSW frame on the selected additional SSW slot 914 or SSW slot 918. In some embodiments, the EDMG STA 954 may determine if the selected SSW slot is free before transmitting and/or check if another device is transmitting on the selected SSW slot at a same time as the EDMG STA 954. In some embodiments, the EDMG STA 954 may select a SSW slot from the additional SSW slots 914.1 through additional SSW slots 914.M, and not consider the SSW slots 918. The additional SSW slots 914 and SSW slots 918 may have a duration that enables a number of SSW frames to be transmitted by the EDMG STA 954 and feedback regarding the SSW frames to be transmitted by the AP/PCP 952 to the EDMG STA 954 (e.g., the EDMG STA 954 may transmit eight SSW frames with a SBIFS duration between the SSW frames, which may be followed by the AP/PCP 952 transmitting feedback to the EDMG STA 954 based on the eight SSW frames.)

In some embodiments, the EDMG STA 954 will first attempt to use a slot from the additional SSW slots 914.1 through 914.M, and then if the selection is unsuccessful (e.g., the SSW slot is in use by another EDMG STA 954) the EDMG STA 954 will attempt to use a slot from the SSW slots 918.1 through 918.X during a next beacon interval.

In some embodiments, the DMG beacon 910.N, or an information element, or field in another packet includes a field of backward compatibility that indicates whether or not the EDMG STA 954 is to be backward compatible. If the field of backward compatible indicates there is no backward compatibility, then the EDMG STA 954 may select a slot from either SSW slots 918 or additional SSW slots 914 in each beacon interval 928. In some embodiments, if the field of backward compatibility indicates that the EDMG STA 954 is to be backward compatible, then the EDMG STA 954 may select a slot from the additional SSW slots 914 first, and only after a failure will the EDMG STA 954 use a slot in the SSW slots 918 during a next beacon interval 928.

The method 900 continues with DMG STA 956 decoding one or more of DMG beacons 910.1 through 910.N and determining values of the A-BFT length field, ATI present field, ATI start field, and ATI duration field as described in conjunction with FIGS. 8A and 8B. DMG STA 956 may determine that DMG STA 956 has DMG responder opportunity 922, which includes SSW slots 918.1 through SSW slot 918.X. DMG STA 956 may determine that ATI 924 starts at time 994 and that A-BFT 904A begins at time 990.

The DMG STA 956 may select a SSW slot from the SSW slots 918.1 through 916.X to transmit a SSW frame on as a responder to the AP/PCP 952. The DMG STA 956 may randomly select a number between 1 and the number of SSW slots included in the SSW slots 918, and transmit a SSW frame on the selected SSW slot 918. The SSW slots 918 may have a duration that enables a number of SSW frames to be transmitted by the DMG STA 956 and feedback regarding the SSW frames to be transmitted by the AP/PCP 952 to the DMG STA 956 (e.g., the DMG STA 956 may transmit eight SSW frames with a SBIFS duration between the SSW frames, which may be followed by the AP/PCP 952 transmitting feedback to the DMG STA 956 based on the eight SSW frames.) The DMG STA 956 may not properly decode the additional SSW frames 914 after time 992 through time 994 during the unknown 924. The DMG STA 956 will not be able to decode one or more fields from the DMG beacon 910, e.g., the multiplier field (e.g., 826) or other fields that are not part of a legacy communication standard the DMG STA 956 is configured to operate in accordance with.

Figure 10:
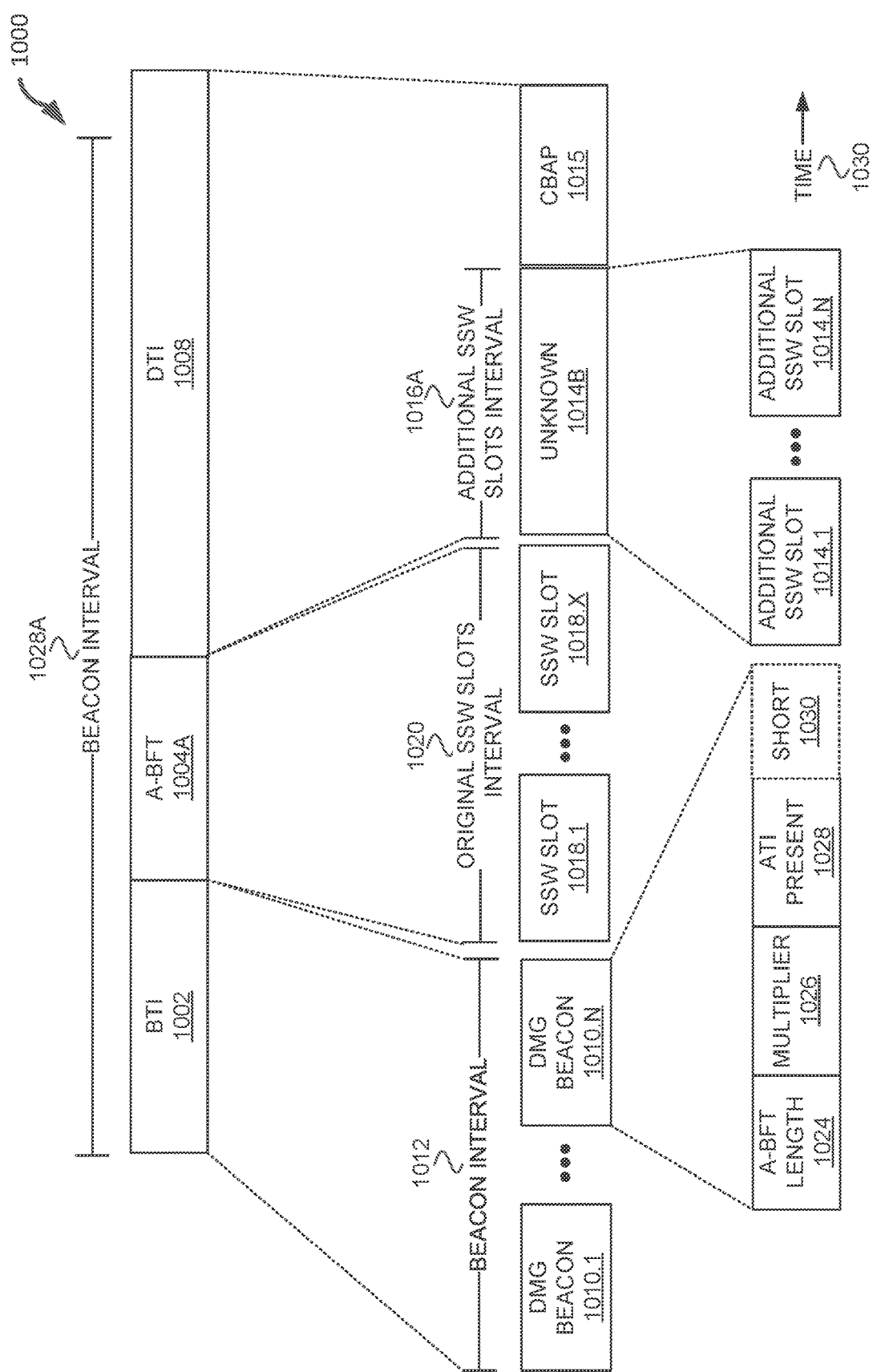
FIG. 10 illustrates beacon interval, having additional SSW slots added after the original SSW slots without an announcement transmission interval (ATI), in accordance with some embodiments.

FIG. 10 illustrates beacon interval 1028A, having additional SSW slots 1014 added after the original SSW slots 1018 without an announcement transmission interval (ATI), in accordance with some embodiments.

Illustrated in FIG. 10 is beacon interval 1028A and time 1030. Beacon interval 1028A may include BTI 1002, A-BFT 1004A, and DTI 1008. FIG. 10 represents how a DMG station (e.g., legacy device 506) or DMG AP (e.g., legacy device 506) would interpret the beacon interval 1028A based on DMG beacons 1010. The beacon interval 1028A includes additional SSW slots 1014 after the SSW slots 1018, and does not include an ATI.

In some embodiments, the BTI 1002 is a portion of the beacon interval 1028A where DMG beacons 1010 may be transmitted by an AP 502 or a station 504 acting as a PCP. The DMG beacons 1010 may be EDMG beacons. DMG beacon 1010.n may include an A-BFT length field 1024, multiplier field 1026, ATI present field 1028, and (optionally) short field 1030.

DMG beacon 1010.N may be the last DMG beacon 1010 of the BTI 1002. The value of the A-BFT length field 1024 may indicate the size or number (e.g., X) of the SSW slots 1018.1 through SSW slots 1018.X. The value of the A-BFT length field 1024 may be in units of SSW slots 1018. In some embodiments, the value of this field may be in the range of 1 to 8. In some embodiments, the value of this field may be equal to a number represented by the A-BFT length field 1024 plus 1.

The multiplier field 1026 may indicate an adjustment to the A-BFT length 1024 field. For example, in some embodiments the multiplier field 1026 may indicate an integer multiple of the number of SSW slots 1018 indicated by the A-BFT length field 1024. The multiplier field 1026 may indicate the number of additional SSW slots 1014 in a different way. The value of the ATI present field 1028 may indicate whether the beacon interval 1028A includes the ATI, which as illustrated in FIG. 10, the beacon interval 1028A does not include the ATI.

The legacy device 506 may not be able to interpret the additional SSW slots 1014 (e.g., unknown 1014B). The legacy device 506 may not defer during the additional SSW slots interval 1016A since the DTI 1008 is a contention based access portion (CBAP) 1015. A legacy device 506 may determine the length of the A-BFT 1004A based on the A-BFT length field 1024. The CBAP 1015 may extend during the entire DTI 1008 for a legacy device 506, which in some embodiments may cause problems since the legacy device 506 may attempt to transmit while a station 504 is using an additional SSW slot 1014. In some embodiments, FIG. 8B without the ATI 806, illustrates how a how an EDMG station (e.g., station 504) or EDMG AP (e.g., AP 502) would interpret a beacon interval without an ATI, e.g., based on DMG beacons 1010.

Figure 11:
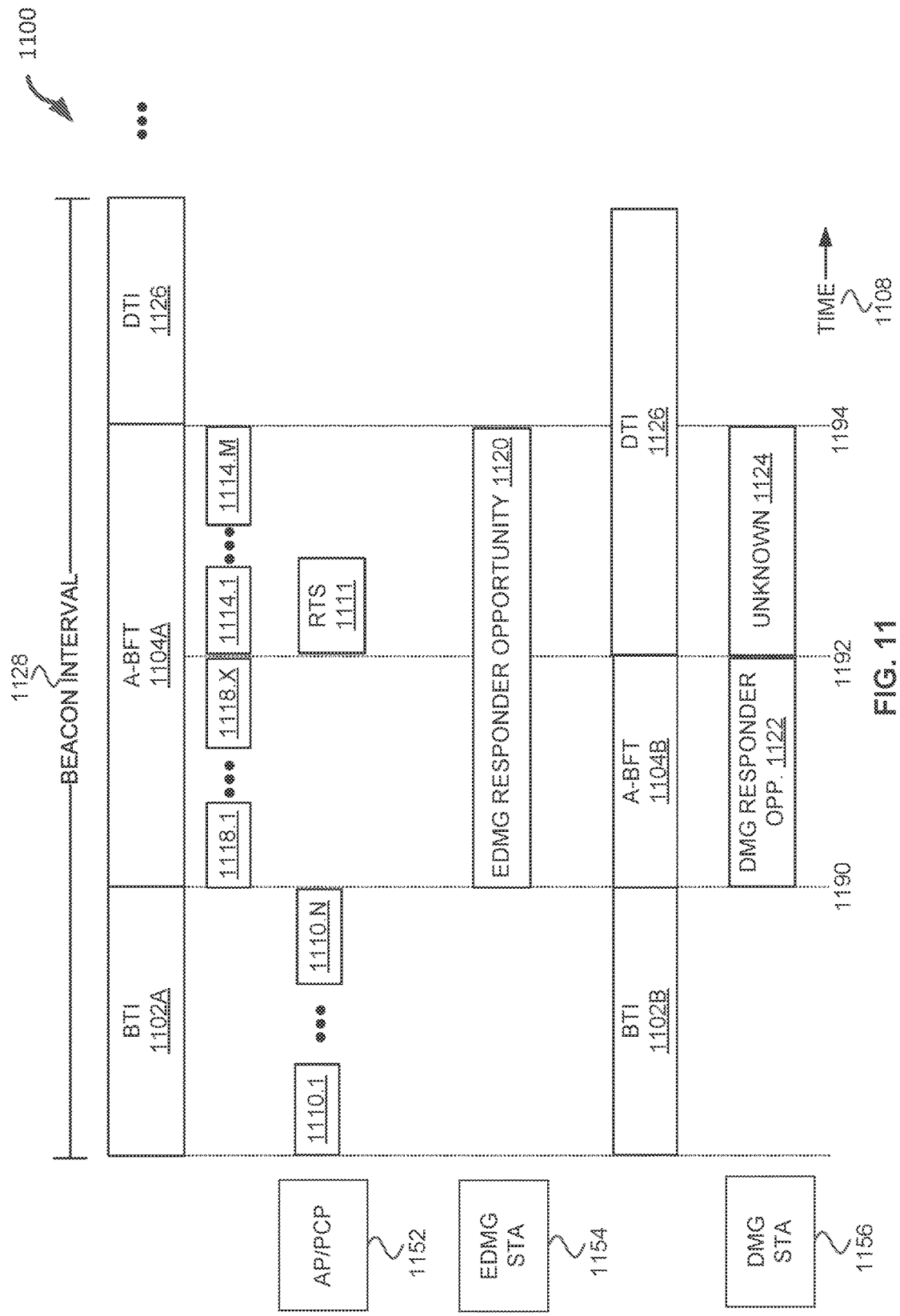
FIG. 11 illustrates a method of extending association beamforming training in accordance with some embodiments.

FIG. 11 illustrates a method 1100 of extending association beamforming training in accordance with some embodiments. Illustrated in FIG. 11 is a beacon interval 1128, AP/PCP 1152, EDMG STA 1154, DMG STA 1156, and time 1108 along a horizontal axis.

The AP/PCP 1152 may be an AP 502 or station 504 acting as a PCP. The EDMG STA 1154 may be a station 504. The DMG STA 1156 may be a legacy station 506.

The beacon interval 1128 may be a beacon interval the same or similar as beacon intervals 1028A or 828B (without the ATI 806). The method 1100 may begin with the AP/PCP 1152 encoding and transmitting DMG beacons 1110.1 through 1110.N. DMG beacons 1110 may be the same or similar as DMG beacons 1010 or 810 (except for DMG beacon 810, it would indicate no ATI present in the ATI present field 828). The AP/PCP 1152 may encode one or more of the DMG beacons 1110.1 through 1110.N to include A-BFT length field (e.g. 1024), multiplier field (e.g., 1026), ATI present field (e.g., 1028), and/or short field (e.g., 1030). The ATI present field (e.g., 1028) indicates that ATI is not present in the beacon interval 1128.

The method 1100 continues with EDMG STA 1154 decoding one or more of DMG beacons 1110.1 through 1110.N and determining a number of SSW slots 1118 and additional SSW slots 1114. For example, EDMG STA 1154 may determine the A-BFT 1104A length as equal to (1+value of multiplier field, e.g., 1026) times (value of A-BFT length, e.g., 1024). EDMG STA 1154 may determine the number of additional SSW slots 1114 based on the value of the A-BFT length field (e.g., 1024) and the value of the multiplier field (e.g., 1026) (e.g., (1+value of multiplier field, e.g., 1026)× value of A-BFT length, e.g., 1024).

EDMG STA 1154 may determine that EDMG STA 1154 has EDMG responder opportunity 1120, which includes additional SSW slots 1114.1 through additional SSW slots 1114.M, and SSW slot 1118.1 through SSW slot 1118.X.

The EDMG STA 1154 may select a SSW slot from the SSW slots 1118.1 through 1118.X, and additional SSW slots 1114.1 through 1114.M to transmit a SSW frame on as a responder to the AP/PCP 1152. In some embodiments, the EDMG STA 1154 may determine not to select a SSW slot 1118 until after first trying to use an additional SSW slot 1114. In some embodiments, the determination may be based on a backward compatibility field (e.g., adjusted field 634, 1236) that indicates whether there are also DMG STAs 1156 and/or whether the EDMG STA 1154 is to operate in a backward compatibility mode.

The method 1100 continues with DMG STA 1156 decoding one or more of DMG beacons 1110.1 through 1110.N and determining, A-BFT length field (e.g., 1024) and that the ATI is not present (e.g., based on ATI present field 1028). DMG STA 1156 may determine that DMG STA 1156 has DMG responder opportunity 1122, which includes SSW slots 1118.1 through SSW slot 1118.X. DMG STA 1156 may determine that A-BFT 1104B ends at time 1192.

The DMG STA 1156 may select a SSW slot from the SSW slots 1118.1 through 1118.X to transmit a SSW frame on as a responder to the AP/PCP 1152. The DMG STA 1156 may randomly select a number between 1 and the number of SSW slots included in the SSW slots 1118, and transmit a SSW frame on the selected SSW slot 1118. The DMG STA 1156 may select a SSW slot 1118 in a different way. The SSW slots 1118 may have a duration that enables a number of SSW frames to be transmitted by the DMG STA 1156 and feedback regarding the SSW frames from the AP/PCP 1152 to the DMG STA 1156 (e.g., the DMG STA 1156 may transmit eight SSW frames with a SBIFS duration between the SSW frames, which may be followed by the AP/PCP 1152 transmitting feedback to the DMG STA 1156 based on the eight SSW frames.)

The method 1100 may continue with the AP/PCP 1152 transmitting a request-to-send (RTS) 1111 with a duration field that extends to time 1194 that is the end of the additional SSW slots 1114 so as to accommodate the additional SSW slots 1114. In some embodiments, the destination address of the RTS 1111 targets DMG STAs 1156 and not EDMG STAs 1154. In some embodiments, the AP/PCP 1152 will determine that there are not DMG STAs 1156 in the network and so will not transmit the RTS 1111. In some embodiments, the AP/PCP 1152 will transmit a different kind of frame to defer the DMG STAs 1156 until the end of the additional SSW slots 1114 (e.g., time 1194).

The method 1110 may continue with the DMG STAs 1156 receiving the RTS 1111 and deferring until time 1194. The method 1110 may continue with the EDMG STA 1154 selecting a slot from the additional SSW slots 1114. In some embodiments, the EDMG STA 1154 may not select a first slot or a slot of the additional SSW slots 1114 that would interfere with the transmission of the RTS 1111.

In some embodiments, the EDMG STA 1154 will first attempt to use a slot from the additional SSW slots 1114.1 through 1114.M, and then if the selection is unsuccessful (e.g., the SSW slot is in use by another EDMG STA 1154) the EDMG STA 1154 will attempt to use a slot from the SSW slots 1118.1 through 1118.X during a next beacon interval.

In some embodiments, the DMG beacon 1110.N, or an information element, or field in another packet includes a field of backward compatibility that indicates whether or not the EDMG STA 1154 is to be backward compatible. If the field of backward compatible indicates there is no backward compatibility, then the EDMG STA 1154 may select a slot from either SSW slots 1118 or additional SSW slots 1114 in each beacon interval 1128. In some embodiments, if the field of backward compatibility indicates that the EDMG STA 1154 is to be backward compatible, then the EDMG STA 1154 may select a slot from the additional SSW slots 1114 first, and only after a failure will the EDMG STA 1154 use a slot in the SSW slots 1118 during a next beacon interval 1128.

Figure 12:
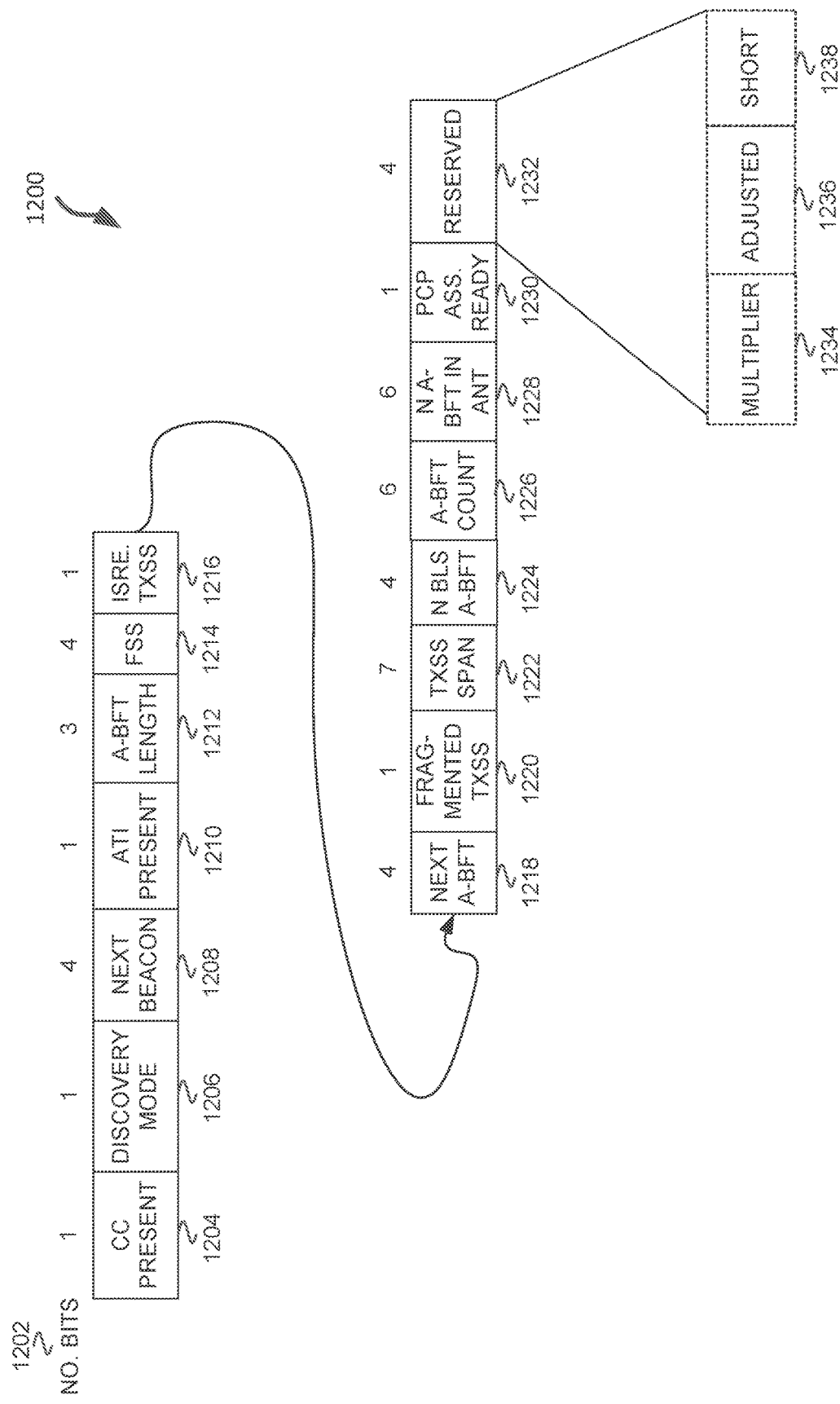
FIG. 12 illustrates fields of a directional multi-gigabit (DMG) beacon in accordance with some embodiments.

FIG. 12 illustrates fields of a directional multi-gigabit (DMG) beacon 1200 in accordance with some embodiments. The DMG beacon 1200 may be an EDMG beacon. One or more of the fields 1204 through 1232 may be part of a beacon interval control field. In some embodiments, one or more of the fields may be part of another frame or an information element included in another frame. Illustrated in FIG. 12 are fields 1204 through 1232 and bits 1202, which may indicate a number of bits of the fields 1204 through 1232. A DMG beacon 1200 may include one or more of the fields 1204 through 1232.

The fields include clustering control (CC) present field 1204, discovery mode field 1206, next beacon field 1208, ATI present field 1210, A-BFT length field 1212, frames per sector sweep (FSS) field 1214, IsResponder (ISRE) transmit sector sweep (TXSS) (ISRE TXSS) field 1216, next A-BFT field 1218, fragmented TXSS field 1220, TXSS span field 1222, N beacon intervals (BIs) A-BFT (N BLS A-BFT) field 1224, A-BFT count field 1226, N A-BFT in antenna (ant) field 1228, PCP association (ass) ready field 1230, and reserved field 1232.

The CC present field 1204 is set to 1 to indicate that clustering control field is present in the DMG beacon, otherwise the clustering control field is not present. The Discovery mode field 1206 is set to 1 if the STA is generating the DMG Beacon following a discovery mode. The next beacon field 1208 indicates the number of beacon intervals following the current beacon interval during which the DMG Beacon is not present.

The ATI present field 1210 is set to 1 to indicate that the ATI is present in the current beacon interval, in accordance with some embodiments. Otherwise, the ATI is not present, in accordance with some embodiments. ATI present field 632, ATI present field 828, and ATI present field 1028 may be embodiments of ATI present field 1210.

The A-BFT length field 1212 specifies the size of the A-BFT following the BTI, and may be defined in units of a SSW slot. The value of the A-BFT length field 1212 may be in a range of 1 to 8, with the value being equal to the bit representation plus 1, in accordance with some embodiments. A-BFT length field 624, A-BFT length field 824, and A-BFT length field 1024 may be embodiments of A-BFT length field 1212 in accordance with some embodiments.

The FSS field 1214 specifies the number of SSW frames allowed per sector sweep slot. The value of this field is in the range of 1 to 16, with the value being equal to the bit representation plus 1, in accordance with some embodiments.

In some embodiments, the ISRE. TXSS field 1216 is set to 1 to indicate the A-BFT following the BTI is used for responder TXSS. This field is set to 0 to indicate responder receive sector sweep (RXSS), in accordance with some embodiments. When this field is set to 0, the FSS field 1214 specifies the length of a complete receive sector sweep by the STA sending the DMG Beacon frame, in accordance with some embodiments.

In some embodiments, the next A-BFT field 1218 indicates the number of beacon intervals during which the A-BFT is not be present. A value of 0 indicates that the A-BFT immediately follows this BTI, in accordance with some embodiments.

In some embodiments, the fragmented TXSS field 1220 is set to 1 to indicate the TXSS is a fragmented sector sweep, and is set to 0 to indicate the TXSS is a complete sector sweep.

In some embodiments, the TXSS span field 1222 field indicates the number of beacon intervals it takes for the STA sending the DMG Beacon frame to complete the TXSS phase.

In some embodiments, the N BLS A-BFT field 1224 indicates the interval, in number of beacon intervals, at which the STA sending the DMG Beacon frame allocates an A-BFT. A value of 1 indicates that every beacon interval contains an A-BFT.

In some embodiments, the A-BFT Count field 1226 indicates the number of A-BFTs since the STA sending the DMG Beacon frame last switched receiver (RX) DMG antennas for an A-BFT.

In some embodiments, the N A-BFT IN ANT 1228 field indicates how many A-BFTs the STA sending the DMG Beacon frame receives from each DMG antenna in the DMG antenna receive rotation.

In some embodiments, the PCP ass Ready 1230 field is set to 1 to indicate that the PCP is ready to receive Association Request frames from non-PCP STAs and is set to 0 otherwise.

The reserved field 1232 may be four bits, in accordance with some embodiments. In some embodiments, the reserved field 1232 may include one or more of a multiplier field 1234, an adjusted field 1236, and/or a short field 1238. Each of the fields 1234, 1236, and 1238 may be one to four bits, in accordance with some embodiments. The multiplier field 1234 may be in accordance with the description of one or more of multiplier field 626, multiplier field 826, and/or multiplier field 1026. The adjusted field 1236 may be in accordance with the description of the adjusted field 634. The short field 1238 field may be in accordance with the description of one or more of short field 636, short field 834, and short field 1030. In some embodiments, the DMG beacon 1200 and/or another frame may include a field to indicate whether backward compatibility is being used to accommodate legacy devices 506 (e.g., DMG stations and/or APs.) For example, one or more of DMG (or EDMG) beacons 610, 710, 810, 910, 1010, and 1110 may include a backward compatibility field, e.g., one or more of the multiplier field 1234, adjusted field 1236, and/or short field 1238 may act as the backward compatibility field or another field (not illustrated) may be used.

Figure 13:
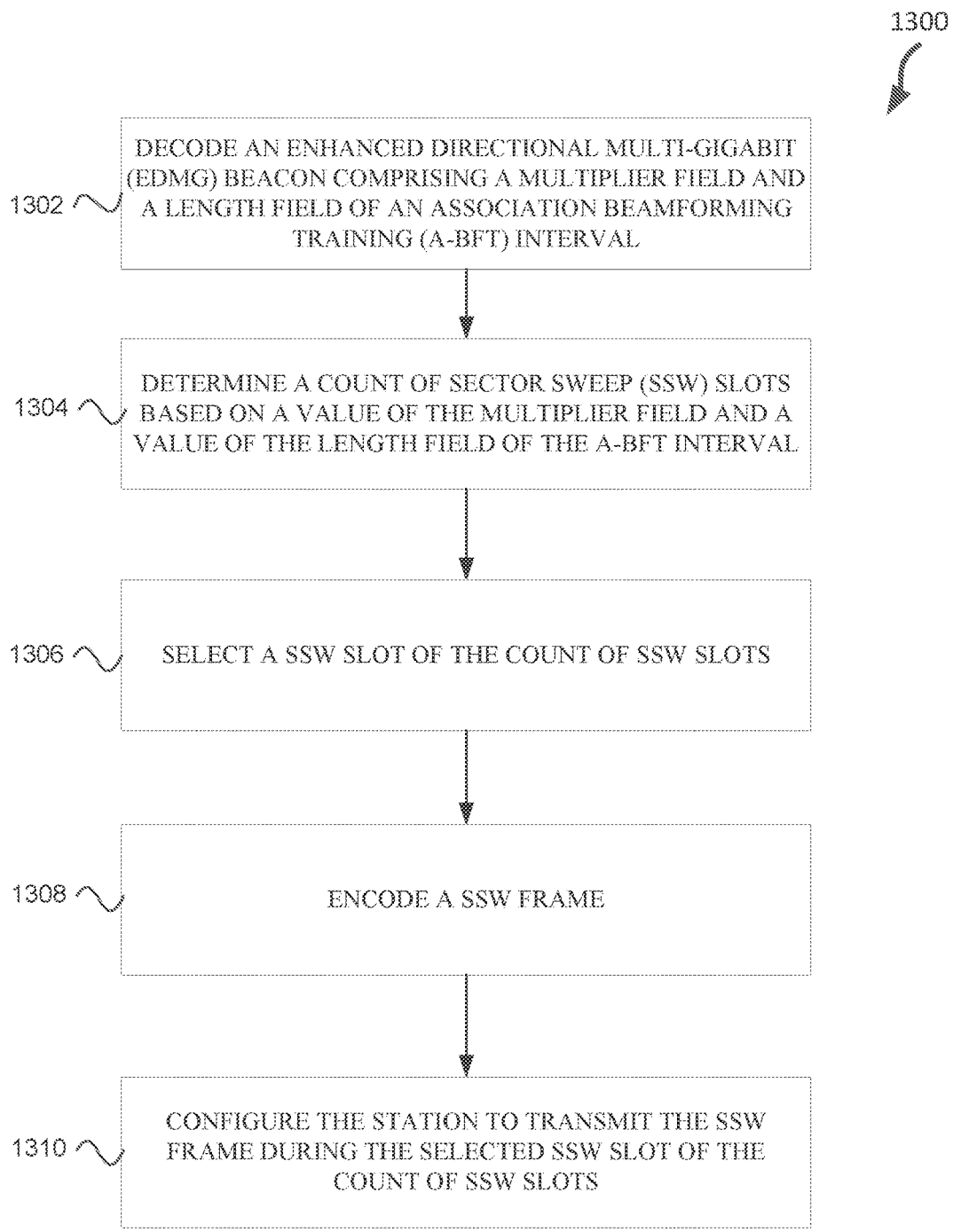
FIG. 13 illustrates a method of extending association beamforming training in accordance with some embodiments.

FIG. 13 illustrates a method 1300 of extending association beamforming training in accordance with some embodiments. The method 1300 may begin with operation 1302 with decoding an EDMG beacon comprising a multiplier field and a length field of an A-BFT interval. For example, EDMG STA 754, EDMG STA 954, or EDMG STA 1154 may decode DMG beacon 710.N, DMG beacon 910.N, or DMG beacon 1110.N, respectively. The DMG beacon may be an EDMG beacon. DMG beacon 710.N, DMG beacon 910.N, and DMG beacon 1110.N, may include multiplier fields 626, 826, 1026, and A-BFT length fields 624, 824, 1024, respectively.

The method 1300 may continue at operation 1304 with determining a count of sector sweep (SSW) slots based on a value of the multiplier field and a value of the length field of the A-BFT interval. For example, EDMG STA 754, EDMG STA 954, or EDMG STA 1154 may determine a number of original SSW slots 718, 918, 1118, and additional SSW slots 714, 914, 1114, respectively, based on multiplier fields 626, 826, 1026, and A-BFT length fields 624, 824, 1024, respectively.

The method 1300 may continue at operation 1306 with selecting a SSW slot of the count of SSW slots. For example, EDMG STA 754, EDMG STA 954, or EDMG STA 1154 may select a slot from EDMG responder opportunity 720, EDMG responder opportunity 920, or EMDG responder opportunity 1120, respectively.

The method 1300 may continue at operation 1308 with encoding a SSW frame. For example, EDMG STA 754, EDMG STA 954, or EDMG STA 1154, may encode a SSW frame to transmit to AP/PCP 752, 952, 1152, respectively.

The method 1300 may continue at operation 1310 with configuring the station to transmit the SSW frame during the selected SSW slot of the count of SSW slots. For example, EDMG STA 754, EDMG STA 954, or EDMG STA 1154, may be configured by an apparatus of EDMG STA 754, EDMG STA 954, or EDMG STA 1154, respectively, to transmit the SSW frame during the selected slot of the SSW slots to the AP/PCP 752, 952, 1152, respectively.

Figure 14:
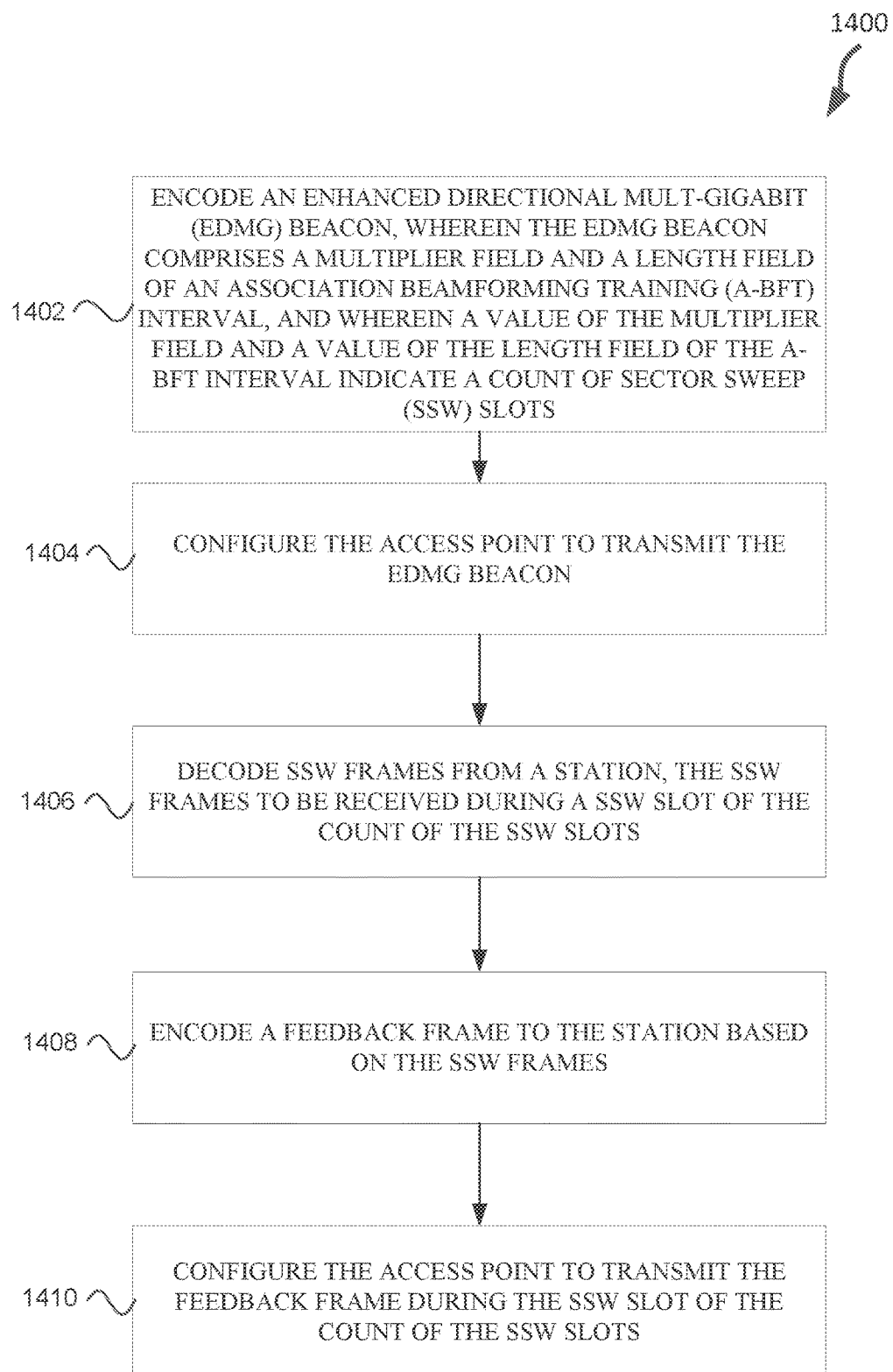
FIG. 14 illustrates a method of extending association beamforming training in accordance with some embodiments.

FIG. 14 illustrates a method 1400 of extending association beamforming training in accordance with some embodiments. The method 1400 may begin at operation 1402 with encoding an EDMG beacon, where the EDMG beacon comprises a multiplier field and a length field of an A-BFT interval, and where a value of the multiplier field and a value of the length field of the A-BFT interval indicate a count of SSW slots.

For example, AP/PCP 752, AP/PCP 952, or AP/PCP 1152 may encode DMG (or EDMG) beacon 710.N, 910.N, and 1110.N, to include an A-BFT length fields 624, 824, 1024, and multiplier fields 626, 826, 1026, respectively, to indicate a number of original SSW slots 718, 918, 1118, and additional SSW slots 714, 914, 1114, respectively.

The method 1400 may continue at operation 1404 with configuring the access point to transmit the EDMG beacon. For example, an apparatus of AP/PCP 752, AP/PCP 952, or AP/PCP 1152, may configure AP/PCP 752, AP/PCP 952, or AP/PCP 1152, respectively, to transmit DMG (or EDMG) beacon 710.N, 910.N, and 1110.N, respectively.

The method 1400 may continue at operation 1406 with decoding SSW frames from a station, the SSW frames to be received during a SSW slot of the count of the SSW slots. For example, AP/PCP 752, AP/PCP 952, or AP/PCP 1152, may decode a SSW frame from EDMG STA 754 (or DMG STA 756), EDMG STA 954 (or DMG STA 956), or EDMG STA 1154 (or DMG STA 1156), respectively.

The method 1400 may continue at operation 1408 with encoding a feedback frame to the station based on the SSW frames. For example, AP/PCP 752, AP/PCP 952, or AP/PCP 1152, may determine feedback based on SSW frames from EDMG STA 754 (or DMG STA 756), EDMG STA 954 (or DMG STA 956), or EDMG STA 1154 (or DMG STA 1156), respectively.

The method 1400 may continue at operation 1410 with configuring the access point to transmit the feedback frame during the SSW slot of the count of the SSW slots. An apparatus of AP/PCP 752, AP/PCP 952 or AP/PCP 1152, may configure AP/PCP 752, AP/PCP 952, or AP/PCP 1152, respectively, to transmit a feedback frame to EDMG STA 754 (or DMG STA 756), EDMG STA 954 (or DMG STA 956), or EDMG STA 1154 (or DMG STA 1156), respectively.

Figure 15:
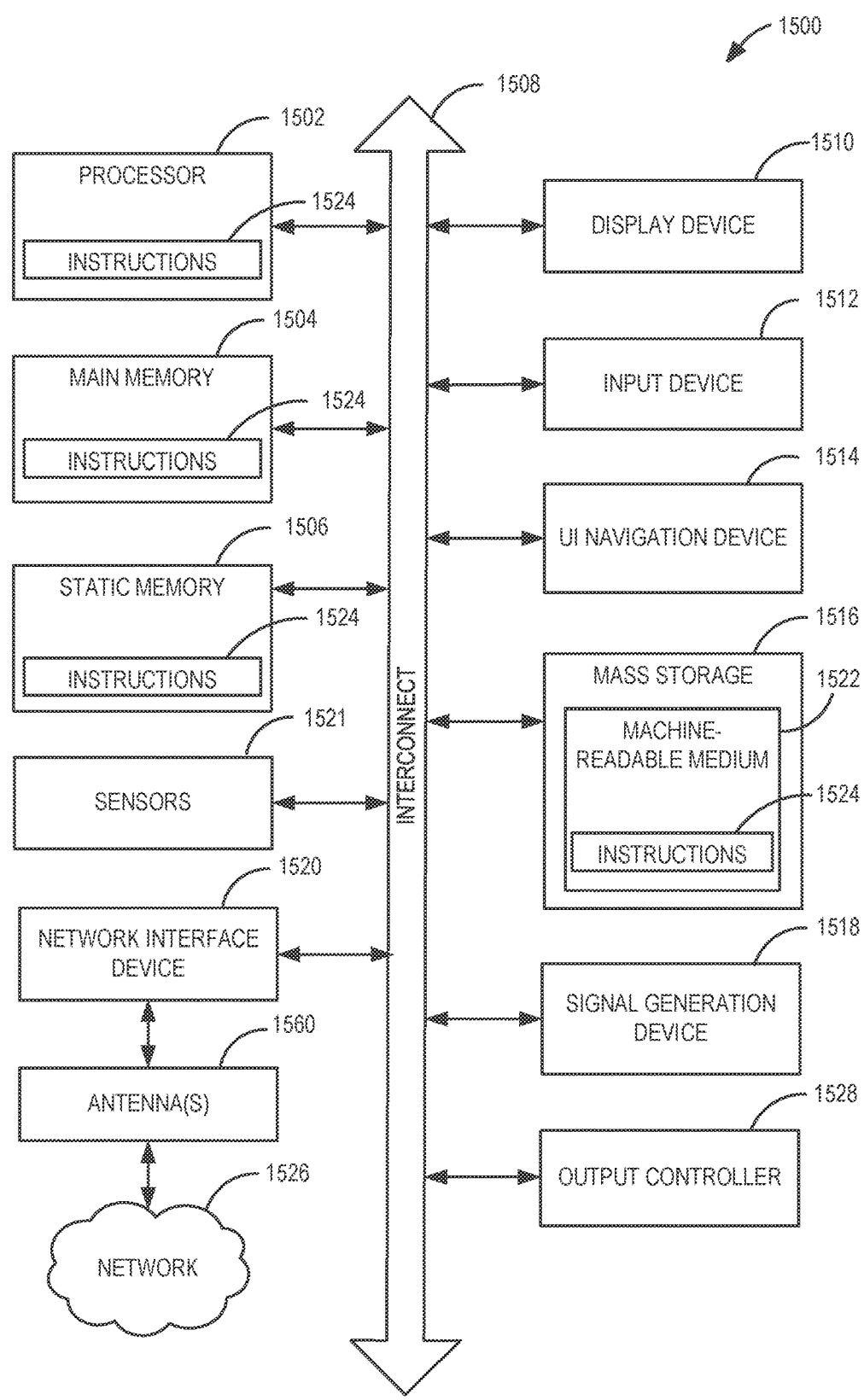
FIG. 15 illustrates a block diagram of an example machine upon which any one or more of the techniques (e.g., methodologies) discussed herein may perform.

FIG. 15 illustrates a block diagram of an example machine 1500 upon which any one or more of the techniques (e.g., methodologies) discussed herein may perform. In alternative embodiments, the machine 1500 may operate as a standalone device or may be connected (e.g., networked) to other machines. In a networked deployment, the machine 1500 may operate in the capacity of a server machine, a client machine, or both in server-client network environments. In an example, the machine 1500 may act as a peer machine in peer-to-peer (P2P) (or other distributed) network environment. The machine 1500 may be an access point 502, station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 1500 may include a hardware processor 1502 (e.g., a central processing unit (CPU), a graphics processing unit (GPU), a hardware processor core, or any combination thereof), a main memory 1504 and a static memory 1506, some or all of which may communicate with each other via an interlink (e.g., bus) 1508.

Specific examples of main memory 1504 include Random Access Memory (RAM), and semiconductor memory devices, which may include, in some embodiments, storage locations in semiconductors such as registers. Specific examples of static memory 1506 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 1500 may further include a display device 1510, an input device 1512 (e.g., a keyboard), and a user interface (UI) navigation device 1514 (e.g., a mouse). In an example, the display device 1510, input device 1512 and UI navigation device 1514 may be a touch screen display. The machine 1500 may additionally include a mass storage (e.g., drive unit) 1516, a signal generation device 1518 (e.g., a speaker), a network interface device 1520, and one or more sensors 1521, such as a global positioning system (GPS) sensor, compass, accelerometer, or other sensor. The machine 1500 may include an output controller 1528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 1502 and/or instructions 1524 may comprise one or more of physical layer circuitry, MAC layer circuitry, processing circuitry, and/or transceiver circuitry. In some embodiments the processing circuitry may include one or more of the processor 1502, the instructions 1524, physical layer circuitry, MAC layer circuitry, and/or transceiver circuitry. The processor 1502, instructions 1524, physical layer circuitry, MAC layer circuitry, processing circuitry, and/or transceiver circuitry may be configured to perform one or more of the methods and/or operations disclosed herein.

The mass storage device 1516 may include a machine readable medium 1522 on which is stored one or more sets of data structures or instructions 1524 (e.g., software) embodying or utilized by any one or more of the techniques or functions described herein. The instructions 1524 may also reside, completely or at least partially, within the main memory 1504, within static memory 1506, or within the processor 1502 during execution thereof by the machine 1500. In an example, one or any combination of the processor 1502, the main memory 1504, the static memory 1506, or the storage device 1516 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 1522 is illustrated as a single medium, the term "machine readable medium" may include a single medium or multiple media (e.g., a centralized or distributed database, and/or associated caches and servers) configured to store the one or more instructions 1524.

In some embodiments, an apparatus used by the station 504 may include one or more example machines 100, 200, 300, 400, or 1500. Accordingly, techniques and operations described herein that refer to the station 504 may be applicable to an apparatus of the station 504, in some embodiments. It should also be noted that in some embodiments, an apparatus used by the AP 502 may include one or more example machines 100, 200, 300, or 1500. Accordingly, techniques and operations described herein that refer to the AP 502 may be applicable to an apparatus for an AP, in some embodiments.

An apparatus of the machine 1500 may be one or more of a processor 1502 (e.g., a central processing unit (CPU), a graphics processing unit (GPU), a hardware processor core, or any combination thereof), a main memory 1504 and a static memory 1506, sensors 1521, network interface device 1520, antennas 1560, a display device 1510, an input device 1512, a UI navigation device 1514, a mass storage 1516, instructions 1524, a signal generation device 1518, and an output controller 1528. The apparatus may be configured to perform one or more of the methods and/or operations disclosed herein. The apparatus may be intended as a component of the machine 1500 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware. Accordingly, apparatuses, devices, and operations described herein that refer to the station 504 and/or AP 502 may be applicable to an apparatus for the station 504 and/or AP 502.

The term "machine readable medium" may include any medium that is capable of storing, encoding, or carrying instructions for execution by the machine 1500 and that cause the machine 1500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1524 may further be transmitted or received over a communications network 1526 using a transmission medium via the network interface device 1520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1520 may include one or more physical jacks (e.g., Ethernet, coaxial, or phone jacks) or one or more antennas to connect to the communications network 1526. In an example, the network interface device 1520 may include one or more antennas 1560 to wirelessly communicate using at least one of single-input multiple-output (SIMO), multiple-input multiple-output (MIMO), or multiple-input single-output (MISO) techniques. In some examples, the network interface device 1520 may wirelessly communicate using Multiple User MIMO techniques. The term "transmission medium" shall be taken to include any intangible medium that is capable of storing, encoding or carrying instructions for execution by the machine 1500, and includes digital or analog communications signals or other intangible medium to facilitate communication of such software.

Figure 16:
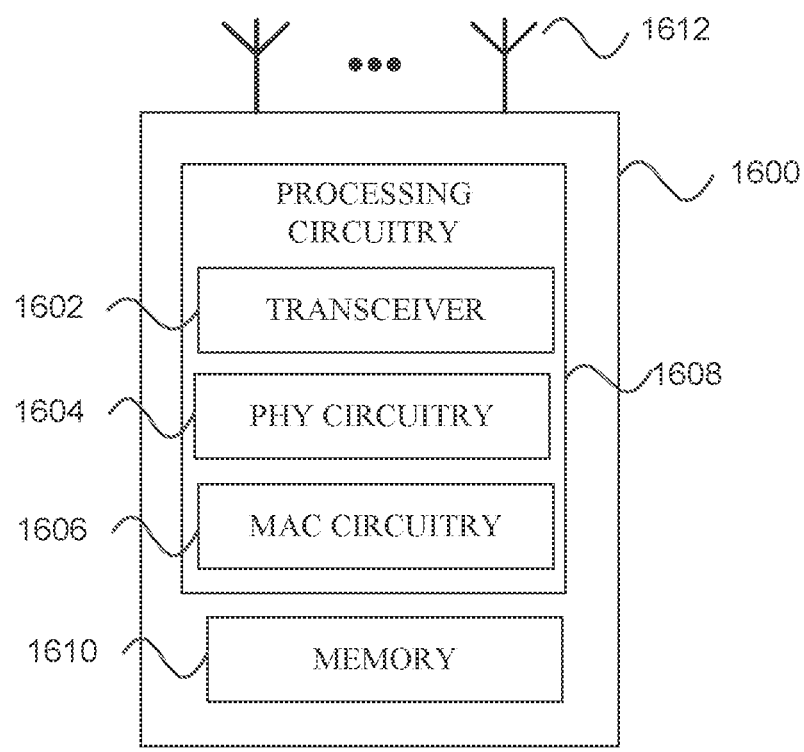
FIG. 16 illustrates a block diagram of an example wireless device upon which any one or more of the techniques (e.g., methodologies or operations) discussed herein may perform.

FIG. 16 illustrates a block diagram of an example wireless device 1600 upon which any one or more of the techniques (e.g., methodologies or operations) discussed herein may perform. The wireless device 1600 may be a HE device. The wireless device 1600 may be a HE STA 504 and/or HE AP 502 (e.g., FIG. 5). A HE STA 504 and/or HE AP 502 may include some or all of the components shown in FIGS. 1-6 or FIGS. 25 and 16. The wireless device 1600 may be an example machine 2500 as disclosed in conjunction with FIG. 25.

The wireless device 1600 may include processing circuitry 1608. The processing circuitry 1608 may include a transceiver 1602, physical layer circuitry (PHY circuitry) 1604, and MAC layer circuitry (MAC circuitry) 1606, one or more of which may enable transmission and reception of signals to and from other wireless devices 1600 (e.g., HE AP 502, HE STA 504, and/or legacy devices 506) using one or more antennas 1612. As an example, the PHY circuitry 1604 may perform various encoding and decoding functions that may include formation of baseband signals for transmission and decoding of received signals. As another example, the transceiver 1602 may perform various transmission and reception functions such as conversion of signals between a baseband range and a Radio Frequency (RF) range.

Accordingly, the PHY circuitry 1604 and the transceiver 1602 may be separate components or may be part of a combined component, e.g., processing circuitry 1608. In addition, some of the described functionality related to transmission and reception of signals may be performed by a combination that may include one, any or all of the PHY circuitry 1604 the transceiver 1602, MAC circuitry 1606, memory 1610, and other components or layers. The MAC circuitry 1606 may control access to the wireless medium. The wireless device 1600 may also include memory 1610 arranged to perform the operations described herein, e.g., some of the operations described herein may be performed by instructions stored in the memory 1610.

The antennas 1612 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 1612 may be effectively separated to take advantage of spatial diversity and the different channel characteristics that may result.

One or more of the memory 1610, the transceiver 1602, the PHY circuitry 1604, the MAC circuitry 1606, the antennas 1612, and/or the processing circuitry 1608 may be coupled with one another. Moreover, although memory 1610, the transceiver 1602, the PHY circuitry 1604, the MAC circuitry 1606, the antennas 1612 are illustrated as separate components, one or more of memory 1610, the transceiver 1602, the PHY circuitry 1604, the MAC circuitry 1606, the antennas 1612 may be integrated in an electronic package or chip.

In some embodiments, the wireless device 1600 may be a mobile device as described in conjunction with FIG. 25. In some embodiments the wireless device 1600 may be configured to operate in accordance with one or more wireless communication standards as described herein (e.g., as described in conjunction with FIGS. 1-6, IEEE 802.11). In some embodiments, the wireless device 1600 may include one or more of the components as described in conjunction with FIG. 25 (e.g., display device 2510, input device 2512, etc.) Although the wireless device 1600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 1600 may include various components of the wireless device 700 as shown in FIG. 7 and/or components from FIGS. 1-5 and 25. Accordingly, techniques and operations described herein that refer to the wireless device 1600 may be applicable to an apparatus for a wireless device 1600 (e.g., HE AP 502 and/or HE STA 504), in some embodiments. In some embodiments, the wireless device 1600 is configured to decode and/or encode signals, packets, and/or frames as described herein, e.g., PPDUs.

In some embodiments, the MAC circuitry 1606 may be arranged to contend for a wireless medium during a contention period to receive control of the medium for a HE TXOP and encode or decode an HE PPDU. In some embodiments, the MAC circuitry 1606 may be arranged to contend for the wireless medium based on channel contention settings, a transmitting power level, and a clear channel assessment level (e.g., an energy detect level).

The PHY circuitry 1604 may be arranged to transmit signals in accordance with one or more communication standards described herein. For example, the PHY circuitry 1604 may be configured to transmit a HE PPDU. The PHY circuitry 1604 may include circuitry for modulation/demodulation, upconversion/downconversion, filtering, amplification, etc. In some embodiments, the processing circuitry 1608 may include one or more processors. The processing circuitry 1608 may be configured to perform functions based on instructions being stored in a RAM or ROM, or based on special purpose circuitry. The processing circuitry 1608 may include a processor such as a general purpose processor or special purpose processor. The processing circuitry 1608 may implement one or more functions associated with antennas 1612, the transceiver 1602, the PHY circuitry 1604, the MAC circuitry 1606, and/or the memory 1610. In some embodiments, the processing circuitry 1608 may be configured to perform one or more of the functions/operations and/or methods described herein.

In mmWave technology, communication between a station (e.g., the HE stations 504 of FIG. 5 or wireless device 1600) and an access point (e.g., the HE AP 502 of FIG. 5 or wireless device 1600) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The following examples pertain to further embodiments. Example 1 is an apparatus of a station including: memory; and processing circuitry coupled to the memory, the processing circuitry configured to: decode an enhanced directional multi-gigabit (EDMG) beacon including a multiplier field and a length field of an association beamforming training (A-BFT) interval; determine a count of sector sweep (SSW) slots based on a value of the multiplier field and a value of the length field of the A-BFT interval; select a SSW slot of the count of SSW slots; encode a SSW frame; and configure the station to transmit the SSW frame during the selected SSW slot of the count of SSW slots.

In Example 2, the subject matter of Example 1 optionally includes where the count of SSW slots comprises original SSW slots and additional SSW slots, and where a count of the original SSW slots is the value of the length field of the A-BFT interval.

In Example 3, the subject matter of Example 2 optionally includes where the processing circuitry is further configured to: determine the count of SSW slots as equal to (the value of the multiplier field+one)×(the value of the length field of the A-BFT interval); and determine a count of the additional SSW slots as the count of SSW slots minus the count of the original SSW slots.

In Example 4, the subject matter of any one or more of Examples 2-3 optionally include where the EDMG beacon is a last EDMG beacon of a beacon interval, and the EDMG beacon further comprises a duration field, and where the additional SSW slots are before the original SSW slots, and where the processing circuitry further configured to: determine a start of the A-BFT interval as a value of the duration field minus a duration of the additional SSW slots, where the A-BFT interval comprises the count of SSW slots.

In Example 5, the subject matter of any one or more of Examples 2-4 optionally include where the EDMG beacon is a last EDMG beacon of a beacon interval, where the EDMG beacon further comprises a duration field, and where the additional SSW slots are before the original SSW slots, and where the processing circuitry further configured to: if a backward compatible field is set, determine a start of the A-BFT interval as a value of the duration field minus a duration of the additional SSW slots, where the A-BFT interval comprises the count of SSW slots.

In Example 6, the subject matter of any one or more of Examples 2-5 optionally include where the additional SSW slots are shorter than the original SSW slots.

In Example 7, the subject matter of any one or more of Examples 2-6 optionally include where the EDMG beacon further comprises a short field that indicates whether the additional SSW slots are a short format or a regular format.

In Example 8, the subject matter of any one or more of Examples 2-7 optionally include where the EDMG beacon is a last EDMG beacon of a beacon interval, and where the beacon interval comprises the A-BFT interval, and the A-BFT interval comprises the count of SSW slots with the original SSW slots before the additional SSW slots.

In Example 9, the subject matter of Example 8 optionally includes where the processing circuitry is further configured to: select the SSW slot of the count of SSW slots from the additional SSW slots and if the transmission of the SSW frame is unsuccessful, wait for a next beacon interval, encode a second SSW frame, select a second slot from the original SSW slots of the next beacon interval, and configure the station to transmit the second SSW frame during the selected second slot.

In Example 10, the subject matter of any one or more of Examples 2-9 optionally include where the EDMG beacon is part of a beacon transmission interval (BTI) of a beacon interval, and where the processing circuitry is further configured to: determine a duration of the BTI based on subtracting a duration of the additional SSW slots from a value of a duration field of the EDMG beacon.

In Example 11, the subject matter of any one or more of Examples 1-10 optionally include where the count of SSW slots comprises original SSW slots and additional SSW slots, and where the processing circuitry is further configured to: select the SSW slot of the count of SSW slots based on one from the following group: the count of SSW slots, a count of the original SSW slots, and a count of the additional SSW slots.

In Example 12, the subject matter of any one or more of Examples 1-11 optionally include ay access point.

In Example 13, the subject matter of any one or more of Examples 1-12 optionally include transceiver circuitry coupled to the processing circuitry, and, one or more antennas coupled to the transceiver circuitry.

Example 14 is a non-transitory computer-readable storage medium that stores instructions for execution by one or more processors, the instructions to configure the one or more processors to cause an apparatus of a station to: decode an enhanced directional multi-gigabit (EDMG) beacon including a multiplier field and a length field of an association beamforming training (A-BFT) interval; determine a count of sector sweep (SSW) slots based on a value of the multiplier field and a value of the length field of the A-BFT interval; select a slot of the count of SSW slots; encode a SSW frame; and configure the station to transmit the SSW frame during the selected slot of the count of SSW slots.

In Example 15, the subject matter of Example 14 optionally includes where the count of SSW slots comprises original SSW slots and additional SSW slots, and where a count of the original SSW slots is the value of the length field of the A-BFT interval.

In Example 16, the subject matter of Example 15 optionally includes where the instructions further configure the one or more processors to cause the apparatus of the station to: determine the count of SSW slots as equal to (the value of the multiplier field+one)×(the value of the length field of the A-BFT interval); and determine a count of the additional SSW slots as the count of SSW slots minus the count of the original SSW slots.

Example 17 is a method performed by an apparatus of a station, the method including: decoding an enhanced directional multi-gigabit (EDMG) beacon including a multiplier field and a length field of an association beamforming training (A-BFT) interval; determining a count of sector sweep (SSW) slots based on a value of the multiplier field and a value of the length field of the A-BFT interval; selecting a slot of the count of SSW slots; encoding a SSW frame; and configuring the station to transmit the SSW frame during the selected slot of the count of SSW slots.

In Example 18, the subject matter of Example 17 optionally includes where the count of SSW slots comprises original SSW slots and additional SSW slots, and where a count of the original SSW slots is the value of the length field of the A-BFT interval, and where the method further comprises: determining the count of SSW slots as equal to (the value of the multiplier field+one)×(the value of the length field of the A-BFT interval); and determining a count of the additional SSW slots as the count of SSW slots minus the count of the original SSW slots.

Example 19 is an apparatus of an access point including: memory; and processing circuitry coupled to the memory, the processing circuitry configured to: encode an enhanced directional mult-gigabit (EDMG) beacon, where the EDMG beacon comprises a multiplier field and a length field of an association beamforming training (A-BFT) interval, and where a value of the multiplier field and a value of the length field of the A-BFT interval indicate a count of sector sweep (SSW) slots; configure the access point to transmit the EDMG beacon; decode SSW frames from a station, the SSW frames to be received during a SSW slot of the count of the SSW slots; encode a feedback frame to the station based on the SSW frames; and configure the access point to transmit the feedback frame during the SSW slot of the count of the SSW slots.

In Example 20, the subject matter of Example 19 optionally includes where the count of SSW slots comprise original SSW slots and additional SSW slots, and where a count of the original SSW slots is a value of the length field of the A-BFT interval.

In Example 21, the subject matter of Example 20 optionally includes where the count of SSW slots is (the value of the multiplier field+one)×(the value of the length field of the A-BFT interval), and a count of the additional SSW slots is the count of SSW slots minus the count of the original SSW slots.

In Example 22, the subject matter of any one or more of Examples 20-21 optionally include where the EDMG beacon is a last EDMG beacon of a beacon interval, and where the additional SSW slots are before the original SSW slots, and where the processing circuitry is further configured to: encode the EDMG beacon to further comprise a duration field equal to a duration of the EDMG beacon and a duration of the additional SSW slots, where the A-BFT interval comprises the count of SSW slots.

In Example 23, the subject matter of any one or more of Examples 20-22 optionally include where the EDMG beacon is part of a beacon interval including the A-BFT interval and an announcement transmission interval (ATI), and where the EDMG beacon further comprises a field to indicate whether the ATI is present after the A-BFT interval in the beacon interval, and where the processing circuitry is further configured to: if the ATI is not present in the beacon interval, encode a request to send (RTS) with a duration equal to a duration of the additional SSW slots, and configure the access point to transmit the RTS a short beamforming inter-frame space (SBIFS) after the A-BFT interval.

In Example 24, the subject matter of any one or more of Examples 19-23 optionally include wherein the access point and the station are each one or more from the following group: an Institute of Electrical and Electronic Engineers (IEEE) 802.11ax access point, an IEEE 802.11ax station, an IEEE 802.11ad station, an IEEE 802.11ad access point, an IEEE 802.11ay station, an IEEE 802.11ay access point, and an IEEE 802.11ay person basic service set (PBSS) control point (PCP).

In Example 23, the subject matter of any one or more of Examples 19-24 optionally include transceiver circuitry coupled to the processing circuitry; and, one or more antennas coupled to the transceiver circuitry.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a station comprising: memory; and processing circuitry coupled to the memory, the processing circuitry configured to:

decode an enhanced directional multi-gigabit (EDMG) beacon comprising a multiplier field and a length field of an association beamforming training (A-BFT) interval;

determine a count of sector sweep (SSW) slots as equal to (a value of the multiplier field plus one) times a value of the length field of the A-BFT interval, wherein the count of SSW slots is equal to a count of original SSW slots plus a count of additional SSW slots, wherein the count of original SSW slots is equal to the value of the length field of the A-BFT interval and the count of the additional SSW slots is equal to (a value of the multiplier field)×(a value of the length field of the A-BFT interval);
    select a SSW slot of the SSW slots of the count of SSW slots;
    encode a SSW frame; and
    configure the station to transmit the SSW frame during the selected SSW slot of the count of SSW slots.

2. The apparatus according to claim 1, wherein the EDMG beacon is a last EDMG beacon of a beacon interval, and the EDMG beacon further comprises a duration field, and wherein the additional SSW slots are before the original SSW slots, and wherein the processing circuitry further configured to:
    determine a start of the A-BFT interval as a value of the duration field minus a duration of the additional SSW slots, wherein the A-BFT interval comprises the count of SSW slots.

3. The apparatus according to claim 1, wherein the EDMG beacon is a last EDMG beacon of a beacon interval, wherein the EDMG beacon further comprises a duration field, and wherein the additional SSW slots are before the original SSW slots, and wherein the processing circuitry further configured to:
    if a backward compatible field is set, determine a start of the A-BFT interval as a value of the duration field minus a duration of the additional SSW slots, wherein the A-BFT interval comprises the count of SSW slots.

4. The apparatus according to claim 1, wherein the additional SSW slots are shorter than the original SSW slots.

5. The apparatus according to claim 1, wherein the EDMG beacon further comprises a short field that indicates whether the additional SSW slots are a short format or a regular format.

6. The apparatus according to claim 1, wherein the EDMG beacon is a last EDMG beacon of a beacon interval, and wherein the beacon interval comprises the A-BFT interval, and the A-BFT interval comprises the count of SSW slots with the original SSW slots before the additional SSW slots.

7. The apparatus of claim 6, wherein the processing circuitry is further configured to:
    select the SSW slot of the count of SSW slots from the additional SSW slots; and
    if the transmission of the SSW frame is unsuccessful, wait for a next beacon interval, encode a second SSW frame, select a second slot from the original SSW slots of the next beacon interval, and configure the station to transmit the second SSW frame during the selected second slot.

8. The apparatus according to claim 1, wherein the EDMG beacon is part of a beacon transmission interval (BTI) of a beacon interval, and wherein the processing circuitry is further configured to:
    determine a duration of the BTI based on subtracting a duration of the additional SSW slots from a value of a duration field of the EDMG beacon.

9. The apparatus of claim 1, wherein the station is one or more from the following group: an Institute of Electrical and Electronic Engineers (IEEE) 802.11ax access point, an IEEE 802.11ax station, an IEEE 802.11ad station, an IEEE 802.11ad access point, an IEEE 802.11ay station, and an IEEE 802.11ay access point.

10. The apparatus of claim 1, further comprising transceiver circuitry coupled to the processing circuitry; and, one or more antennas coupled to the transceiver circuitry.

11. A non-transitory computer-readable storage medium that stores instructions for execution by one or more processors, the instructions to configure the one or more processors to cause an apparatus of a station to:
    decode an enhanced directional multi-gigabit (EDMG) beacon comprising a multiplier field and a length field of an association beamforming training (A-BFT) interval;
    determine a count of sector sweep (SSW) slots as equal to (a value of the multiplier field plus one) times a value of the length field of the A-BFT interval, wherein the count of SSW slots is equal to a count of original SSW slots plus a count of additional SSW slots, wherein the count of original SSW slots is equal to the value of the length field of the A-BFT interval and the count of the additional SSW slots is equal to (a value of the multiplier field)×(a value of the length field of the A-BFT interval);
    select a SSW slot of the SSW slots of the count of SSW slots;
    encode a SSW frame; and
    configure the station to transmit the SSW frame during the selected SSW slot of the count of SSW slots.

12. A method performed by an apparatus of a station, the method comprising:
    decoding an enhanced directional multi-gigabit (EDMG) beacon comprising a multiplier field and a length field of an association beamforming training (A-BFT) interval;
    determining a count of sector sweep (SSW) slots as equal to (a value of the multiplier field plus one) times a value of the length field of the A-BFT interval, wherein the count of SSW slots is equal to a count of original SSW slots plus a count of additional SSW slots, wherein the count of original SSW slots is equal to the value of the length field of the A-BFT interval and the count of the additional SSW slots is equal to (a value of the multiplier field)×(a value of the length field of the A-BFT interval);
    selecting a SSW slot of the SSW slots of the count of SSW slots;
    encoding a SSW frame; and
    configuring the station to transmit the SSW frame during the selected SSW slot of the count of SSW slots.

13. An apparatus of an access point comprising: memory; and processing circuitry coupled to the memory, the processing circuitry configured to:
    encode an enhanced directional multi-gigabit (EDMG) beacon, wherein the EDMG beacon comprises a multiplier field and a length field of an association beamforming training (A-BFT) interval, and wherein La value of the multiplier field +1) times a value of the length field of the A-BFT interval is equal to a count of sector sweep (SSW) slots, wherein the count of SSW slots comprise original SSW slots and additional SSW slots, and wherein a count of the original SSW slots is a value of the length field of the A-BFT interval;
    configure the access point to transmit the EDMG beacon;
    decode SSW frames from a station, the SSW frames to be received during a SSW slot of the count of the SSW slots;
    encode a feedback frame to the station based on the SSW frames; and configure the access point to transmit the feedback frame during the SSW slot of the count of the SSW slots.

14. The apparatus of claim 13, wherein a count of the additional SSW slots is the count of SSW slots minus the count of the original SSW slots.

15. The apparatus of claim 13, wherein the EDMG beacon is a last EDMG beacon of a beacon interval, and wherein the additional SSW slots are before the original SSW slots, and wherein the processing circuitry is further configured to:

encode the EDMG beacon to further comprise a duration field equal to a duration of the EDMG beacon and a duration of the additional SSW slots, wherein the A-BFT interval comprises the count of SSW slots.

16. The apparatus of claim 13, wherein the EDMG beacon is part of a beacon interval comprising the A-BFT interval and an announcement transmission interval (ATI), and wherein the EDMG beacon further comprises a field to indicate whether the ATI is present after the A-BFT interval in the beacon interval, and wherein the processing circuitry is further configured to:

if the ATI is not present in the beacon interval, encode a request to send (RTS) with a duration equal to a duration of the additional SSW slots, and configure the access point to transmit the RTS a short beamforming inter-frame space (SBIFS) after the A-BFT interval.

17. The apparatus of claim 13, wherein the access point and the station are each one or more from the following group: an Institute of Electrical and Electronic Engineers (IEEE) 802.11ax access point, an IEEE 802.11ax station, an IEEE 802.11ad station, an IEEE 802.11ad access point, an IEEE 802.11ay station, an IEEE 802.11ay access point, and an IEEE 802.11ay person basic service set (PBSS) control point (PCP).

18. The apparatus of claim 13, further comprising transceiver circuitry coupled to the processing circuitry; and, one or more antennas coupled to the transceiver circuitry.

* * * * *

UNITED STATES PATENT AND TRADEMARK OFFICE
CERTIFICATE OF CORRECTION

PATENT NO.        : 10,511,369 B2
APPLICATION NO.   : 15/627501
DATED             : December 17, 2019
INVENTOR(S)       : Johnsson et al.

Page 1 of 1

It is certified that error appears in the above-identified patent and that said Letters Patent is hereby corrected as shown below:

In the Claims

In Column 32, Line 55, in Claim 13, delete "La" and insert --(a-- therefor

In Column 32, Line 56, in Claim 13, delete ")".

Signed and Sealed this
Eighteenth Day of August, 2020

Andrei Iancu
*Director of the United States Patent and Trademark Office*